United States Patent [19]
Shoemaker

[11] Patent Number: 5,642,050
[45] Date of Patent: Jun. 24, 1997

[54] PLURAL FREQUENCY METHOD AND SYSTEM FOR IDENTIFYING METAL OBJECTS IN A BACKGROUND ENVIRONMENT USING A TARGET MODEL

[75] Inventor: Donald K. Shoemaker, Sweet Home, Oreg.

[73] Assignee: White's Electronics, Inc., Sweet Home, Oreg.

[21] Appl. No.: 576,064

[22] Filed: Dec. 21, 1995

[51] Int. Cl.⁶ .......................... G01V 3/11; G01V 3/165
[52] U.S. Cl. .................. 324/329; 324/232; 324/233; 324/335
[58] Field of Search ........................ 324/326, 329, 324/334, 335, 232, 233, 239–243

[56] References Cited

U.S. PATENT DOCUMENTS

| | | | |
|---|---|---|---|
| 2,463,252 | 3/1949 | Doll | 323/75 |
| 3,012,190 | 12/1961 | Doll | 324/41 |
| 3,355,658 | 11/1967 | Gardiner | 324/3 |
| 3,896,371 | 7/1975 | Hametta | 324/3 |
| 3,986,104 | 10/1976 | Randolph, Jr. | 324/3 |
| 4,024,468 | 5/1977 | Hirschi | 324/3 |
| 4,030,026 | 6/1977 | Payne | 324/3 |
| 4,110,679 | 8/1978 | Payne | 324/3 |
| 4,128,803 | 12/1978 | Payne | 324/3 |
| 4,249,128 | 2/1981 | Karbowski | 324/329 |
| 4,263,553 | 4/1981 | Cook et al. | 324/327 |
| 4,293,816 | 10/1981 | Johnson | 324/329 |
| 4,514,692 | 4/1985 | Johnson et al. | 324/329 |
| 4,563,644 | 1/1986 | Lenander et al. | 324/232 |
| 4,628,265 | 12/1986 | Johnson et al. | 324/329 |
| 4,783,630 | 11/1988 | Shoemaker | 324/329 |
| 4,868,910 | 9/1989 | Maulding | 324/233 |
| 4,894,618 | 1/1990 | Candy | 324/329 |
| 4,942,360 | 7/1990 | Candy | 324/329 |
| 5,414,411 | 5/1995 | Lahr | 340/568 |
| 5,506,506 | 4/1996 | Candy | 324/329 |

FOREIGN PATENT DOCUMENTS

WO87/04801 8/1987 WIPO.

Primary Examiner—Gerard R. Strecker
Attorney, Agent, or Firm—Klarquist Sparkman Campbell Leigh & Whinston, LLP

[57] ABSTRACT

A system for detecting metal targets located in a background environment such as the ground evaluates metal targets by processing components of signals at two or more different frequencies. A component of the received signal induced by the ground can be eliminated by subtracting signal components measured at two different frequencies. The received signal can be processed to account for changes in the background response with frequency. The type of an unknown target can be identified by processing background excluded components to produce data characterizing the target type.

14 Claims, 11 Drawing Sheets

PLURAL FREQUENCY METHOD AND SYSTEM FOR IDENTIFYING METAL OBJECTS IN A BACKGROUND ENVIRONMENT USING A TARGET MODEL

FIELD OF THE INVENTION

The invention generally relates to metal detectors and, more specifically, relates to a plural frequency method and system for identifying metal objects located in a background environment such as mineralized ground.

BACKGROUND OF THE INVENTION

Metal detectors are commonly used to locate metal objects or "targets" buried in the ground or some other background environment. In general, metal detectors sense metal targets by detecting disturbances in an electromagnetic field. There are a number of ways to detect these disturbances, but typically, they are sensed by observing signals in a search coil assembly. In this context, it is important that the metal detector distinguish between signals induced by the target and the background environment.

In practice, extracting meaningful data to identify a target in the presence of a background environment is a difficult problem. Metal targets exhibit behavior that is hard to classify because it varies with the shape and composition of the target as well as the distance and orientation relative to the detector. In addition, the behavior of the background environment changes due to changes in its composition. For example, ground can have a varying degree of iron content, which has ferromagnetic properties. The ground can also include slightly conductive materials as well. Assumptions about the signals induced by the background environment can simplify the design of the metal detector, but often lead to inaccuracies in detecting and evaluating a target.

A transmit/receive, induction balanced metal detector is one type of detector commonly used to locate metal objects in the ground. The detector is referred to as "induction balanced" because it employs an induction balanced search loop to sense targets. In this type of detector, the search loop (also known as the "search head") includes a transmit and receive coil. The two coils are designed such that the mutual inductance between them is balanced or "nulled." When a signal is applied to the transmit coil in the presence of a metal object a response signal is induced in the receive coil. Both the metal object and the background material that surrounds it can contribute to the response signal, so the signal must be processed to reduce the portion of the signal induced by the background material.

When the search loop transmits and receives a signal at a single frequency, it is particularly difficult to extract meaningful information from the response signal that is useful in evaluating a metal target. "Single frequency" metal detectors transmit and receive a signal at a single frequency, and then measure the phase angle and magnitude of the received signal. These "single frequency" detectors typically measure the response signal with two phase detectors in quadrature, and then compute a resistive to reactive ratio from the outputs of the phase detectors. The user can then attempt to identify a target buried in the ground by its resistive to reactive ratio.

It is difficult to identify targets in the background environment in a single frequency detector. As the user sweeps the search loop over the ground, the motion produces changes in the received signal. Since the frequency of these changes is different for the ground than for a metal target, filters are typically used to reduce the portion of the response signal due to the ground. When filters are used, however, the user has to move the search head skillfully to identify targets in the ground. The performance of the metal detector varies with sweep speed, making it difficult to obtain a resistive to reactive ratio that is useful in discriminating among different types of targets.

Identifying a target is especially difficult where the ground produces a strong response or changes often. Moreover, targets deeper in the ground are more difficult to detect, even for more experienced users.

Another problem with using filters is that distortion can occur when a number of metal objects are near the sweep path of the detector. Filters tend to store energy due to a target for a delayed period because of a phenomena known as group delay. As the user sweeps the search head, the filter can retain energy from a first target while the search head is actually located over another. Because of this effect, the user can miss valuable targets and waste time digging in the wrong place.

The resistive to reactive ratio computed in the single frequency metal detectors described above can assist a user in discriminating among targets. To accomplish target discrimination effectively however, the user must move the search loop very skillfully over the ground. Even assuming the user can move the search head skillfully, target discrimination is difficult because many targets have similar resistive to reactive ratios.

One approach for improving on the single frequency method is to use ground exclusion balancing. The ground response can be substantially removed by adjusting a phase axis of the detector to be in quadrature with the ground response. The ground balanced phase detector axis can be derived by summing the two quadrature outputs. Ground balancing is limited in that it only removes the ground component from the phase detector axis in quadrature with the ground response. The other phase detection axis still includes a ground component. Ground exclusion balancing, however, can be used to improve a single frequency detector by using it to trigger the measurement of a resistive to reactive ratio. For example, ground exclusion balancing circuitry can be used to gate on circuitry used to measure a resistive to reactive ratio when a target is present. As a result, the resistive to reactive ratio need only be computed when a target is near the search head. This approach can improve a single frequency metal detector, but the problems of target identification still remain.

As an alternative approach, some metal detectors transmit and receive signals at two frequencies and process the received signals to detect metal objects in a background environment. These types of detectors, to the extent known to the inventor, have a variety of limitations. First, some of these detectors process signals at different frequencies for the sole purpose of distinguishing metal objects from the background environment. These detectors fail to provide target specific data to identify an unknown target.

Second, some of these detectors make improper assumptions about response signals due to the background material. The most common assumption is that the background response does not change with frequency. In many environments, this assumption is not valid. Therefore, detectors based on this assumption produce erroneous results in background environments where the background induced signal changes with frequency.

SUMMARY OF THE INVENTION

The invention provides a plural frequency method and system for identifying metal targets in a background environment. In one embodiment, a metal detector produces a ratio of DC resistance to inductance and a skin constant to identify target type. To detect a target, the metal detector transmits at least two signals at different frequencies and then receives response signals in a receive coil. The metal detector includes phase detectors to measure components of the response signals at two different phases. The metal detector generates background excluded components from the signal components measured in the phase detectors. A signal processor then computes the ratio and the skin constant from background excluded components.

There are a number of ways to generate the background excluded components. In one method, the background excluded components are computed by subtracting components in phase with the background response at two different frequencies. In another method, filters are used to remove at least a portion of the background response from the components measured by the phase detectors. In one specific implementation, filtered resistive and reactive components are processed to compute the ratio of inductance to DC resistance and the skin constant. In still another embodiment, a differential loop configuration is used to generate background excluded response data. In this case, the phase detectors can then be used to generate two background excluded components for each frequency. As will become apparent from the description below, there are a number of different ways to generate the background excluded data.

The invention has a number of advantages. The ratio of inductance to DC resistance and skin constant provide specific information to identify a target in a background environment. This information can be used to identify targets buried more deeply in the ground or in the midst of trash. Moreover, the ratio of inductance to DC resistance provides additional information about the target relative to approaches that merely produce a resistive to reactive ratio, and this data can be processed further to generate other data about a target such as a peak frequency or a plot of the resistive to reactive components over a range of frequencies. As an additional advantage, the skin constant can provide information about the size and shape of the target.

Further advantages and features of the invention will become apparent from the following detailed description and accompanying drawings.

DETAILED DESCRIPTION

Figure 1:
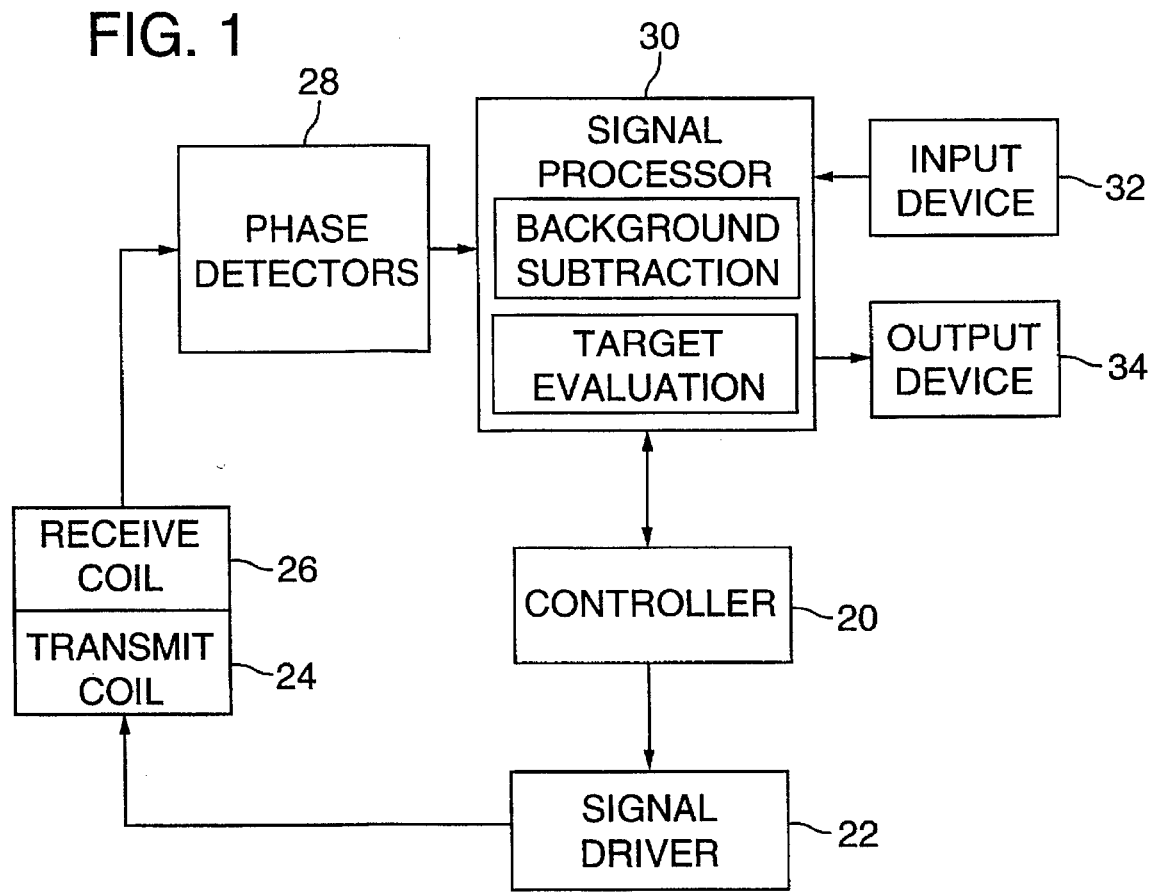
FIG. 1 is a functional block diagram illustrating an embodiment of the invention in a metal detector.

FIG. 1 is a functional block diagram illustrating an embodiment of the invention in a metal detector. The metal detector illustrated in FIG. 1 includes a controller 20, a signal driver 22, transmit and receive coils 24, 26, phase detectors 28, a signal processor 30, and input and output devices 32, 34.

The input device 32 enables the user to control the metal detector. For instance, the user can use the input device to adjust the detector for different ground environments. As another example, a user can select operating modes through the input device, such as modes for ground balancing or adjusting the phase detectors to cancel or record offsets, modes to input target data used in comparing with unknown targets, and search modes for detecting and identifying unknown targets.

During the process of searching for metal targets, the controller 20 provides control signals to the signal driver 22 and the signal processor 30. The controller 20 causes the signal driver 22 to apply sinusoidal signals at two or more frequencies to the transmit coil 24. The signal driver can be implemented to apply these periodic drive signals in parallel or in series to the transmit coil. If implemented in parallel, typically a separate channel would be provided for processing received signals corresponding to the various frequencies of the transmitted signals. Also, each of these channels would typically include separate X and Y phase detectors for processing the received signals in the manner described below for a series implementation. Any mutual inductance between the transmit and receive coils is nulled so that signals induced in the receive coil are attributable to the background material and any metal target(s) located in it.

The signals induced in the receive coil 26 are applied to the phase detectors 28. The phase detectors measure the signal in the receive coil at two different phases. Because the signal driver 22 drives the transmit coil at two or more frequencies, the phase detectors are designed to measure the received signals at frequencies corresponding to the drive signal frequencies.

The signal processor 30 receives output signal components from the phase detectors 28 and processes these components to perform background subtraction and target evaluation. Background subtraction refers generally to the process of subtracting signal components measured at different frequencies to remove a component of the received signal induced by the background material. The result of background subtraction in the illustrated embodiment are background excluded components of the received signal. These background excluded components can be used in target evaluation. Target evaluation refers generally to processing the background excluded components to evaluate an unknown target. After processing the background excluded components, the signal processor 30 transfers the results of its target evaluation to an output device 34.

The output device conveys the results of the target evaluation to the user. Preferably, the output device includes a display device for presenting alphanumeric and graphical data to the user. The output device can also include an audio speaker, which can indicate to the user when metal targets are in proximity to the search loop.

Figure 2:
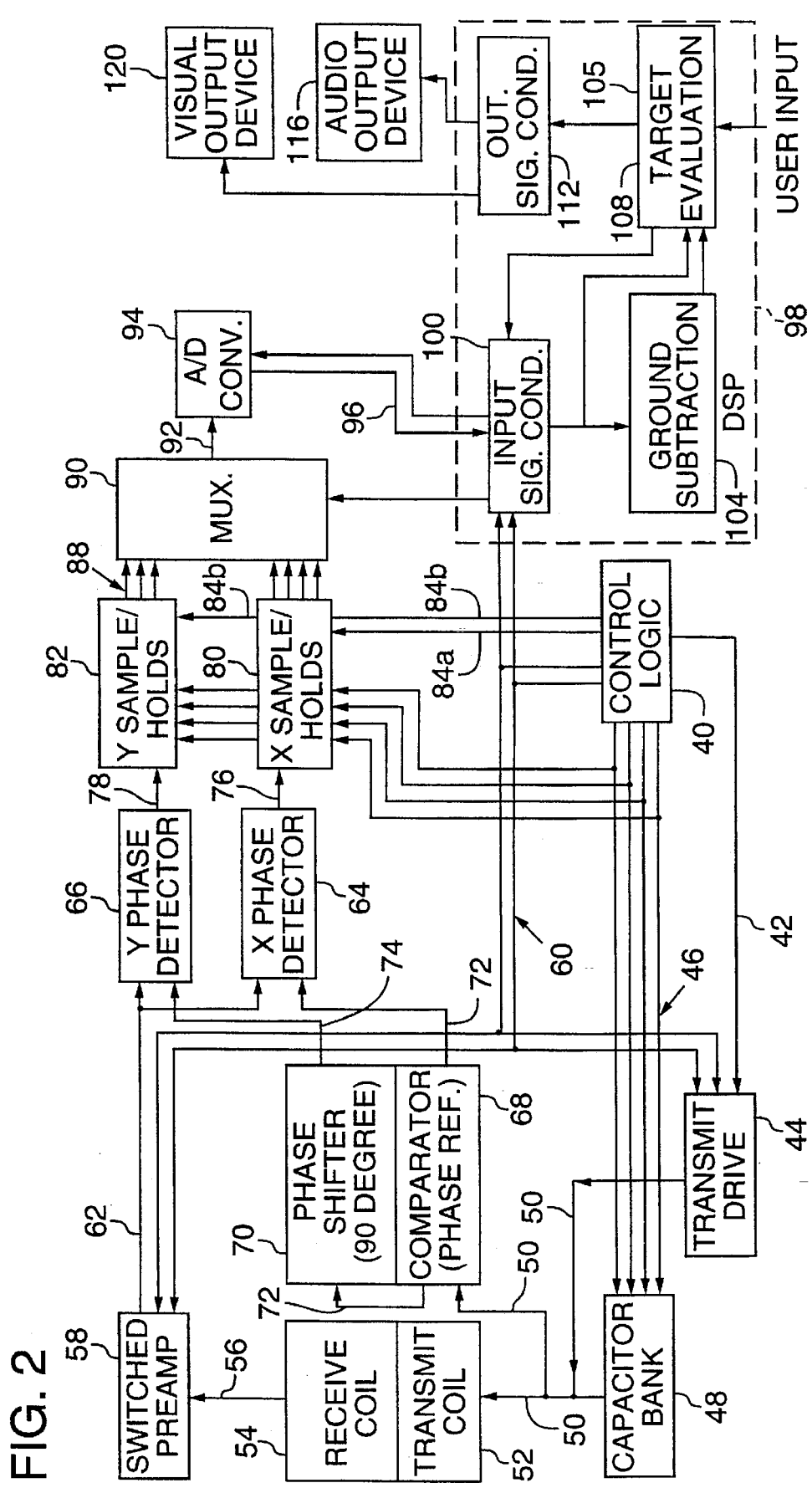
FIG. 2 is a block diagram illustrating the metal detector of FIG. 1 in more detail.
Figure 3A:
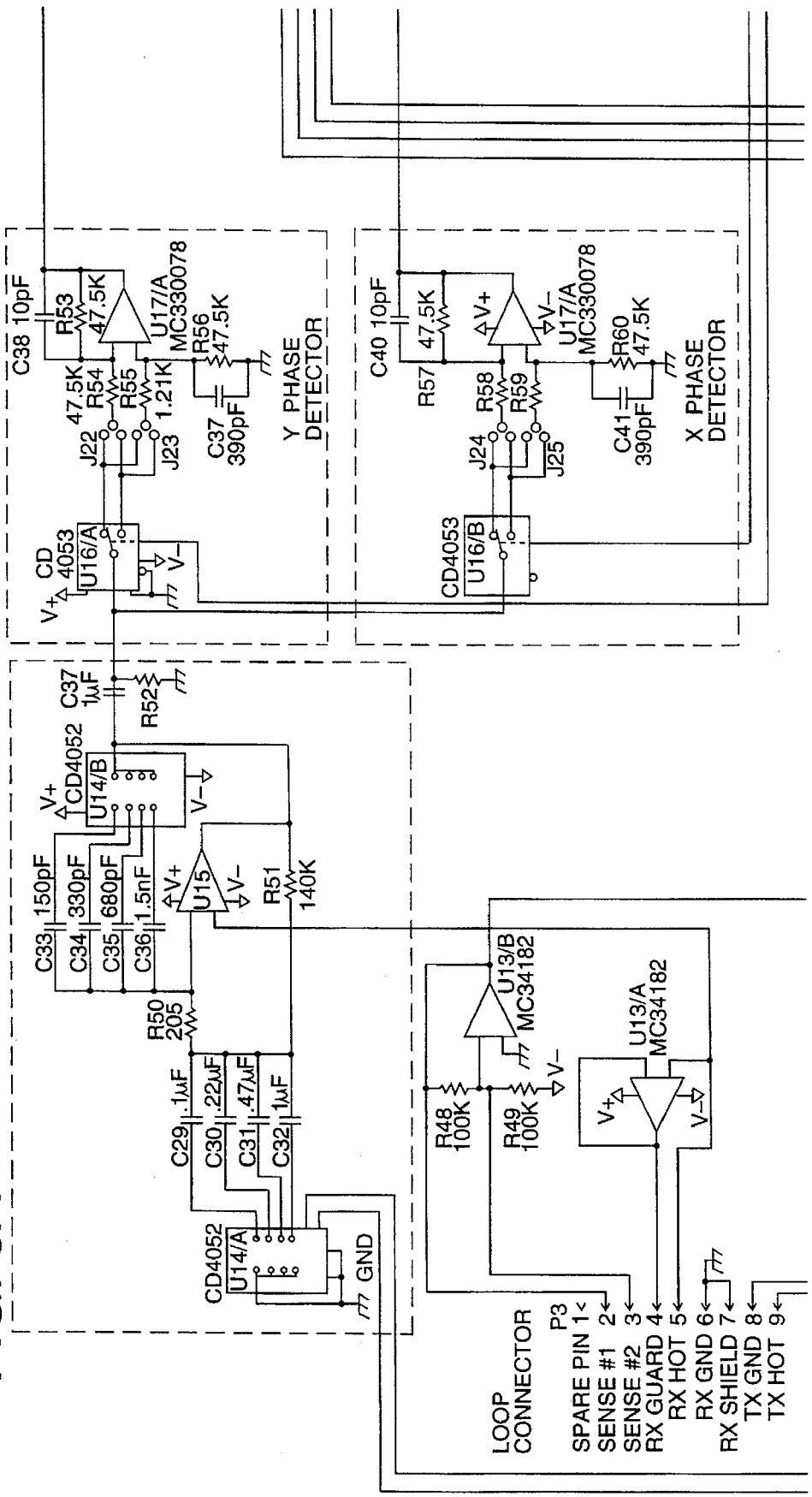
FIG. 3A–D is a schematic diagram illustrating a specific embodiment of the metal detector of FIG. 2.
Figure 3B:
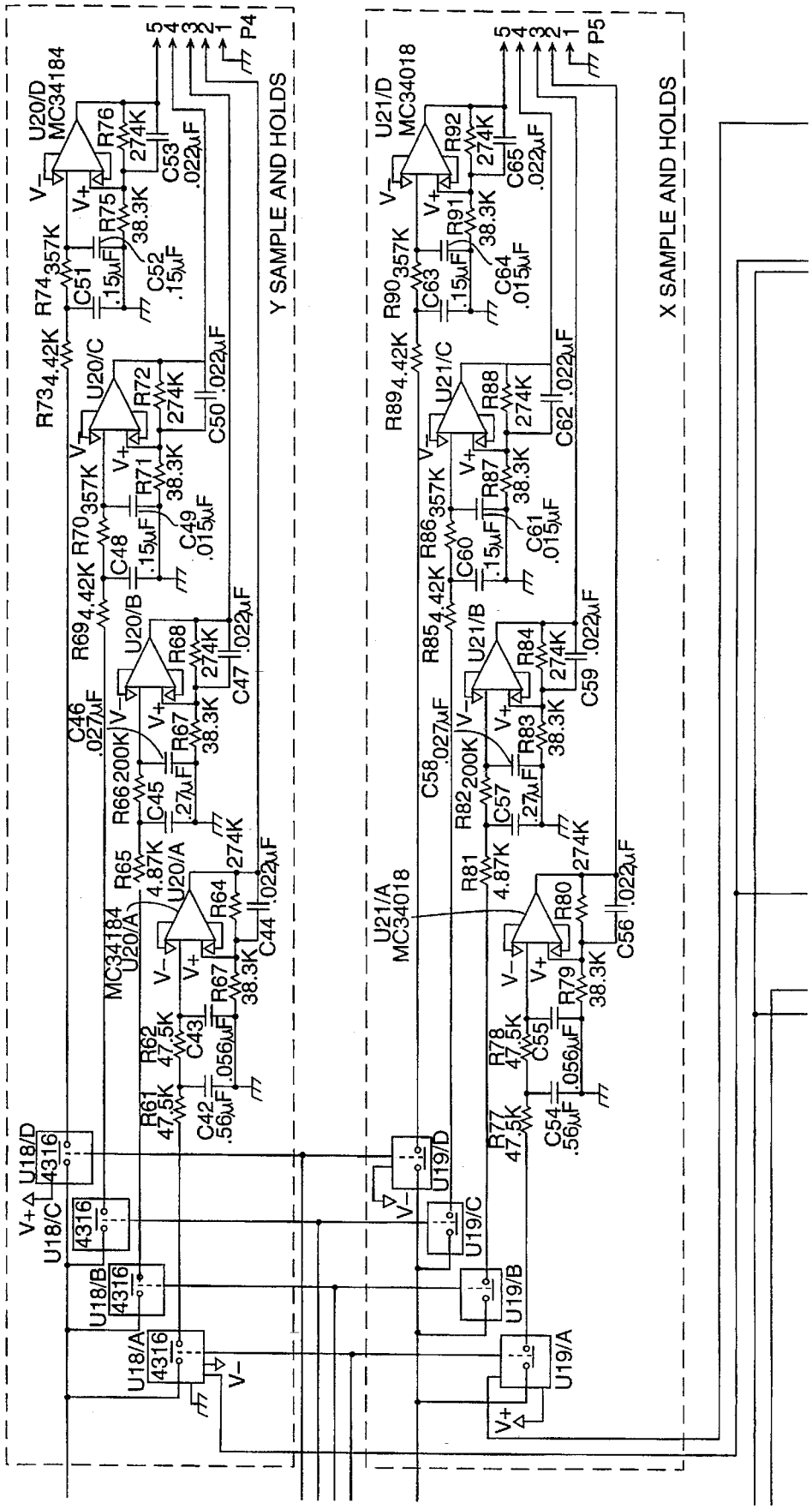
Figure 3C:
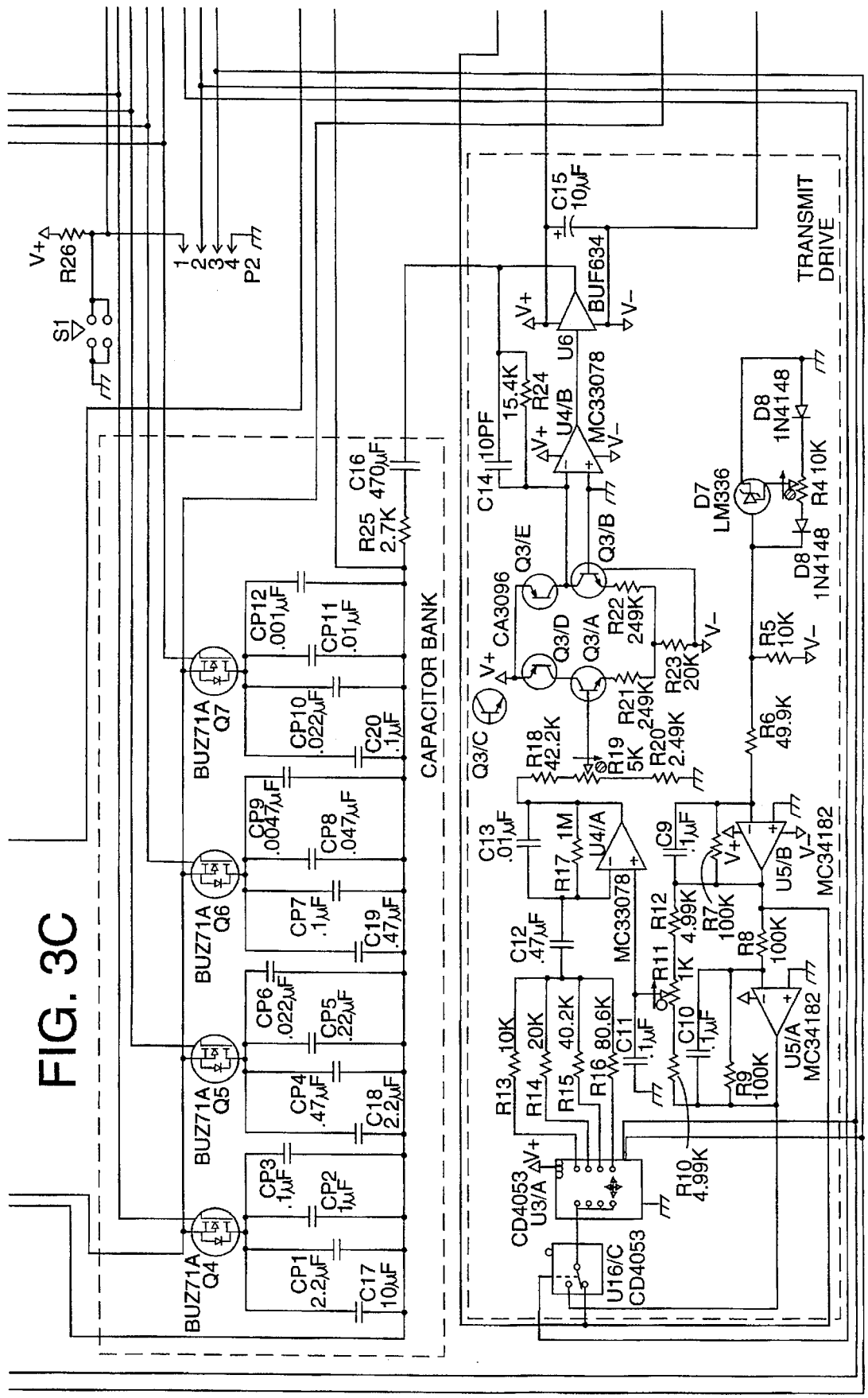
Figure 3D:
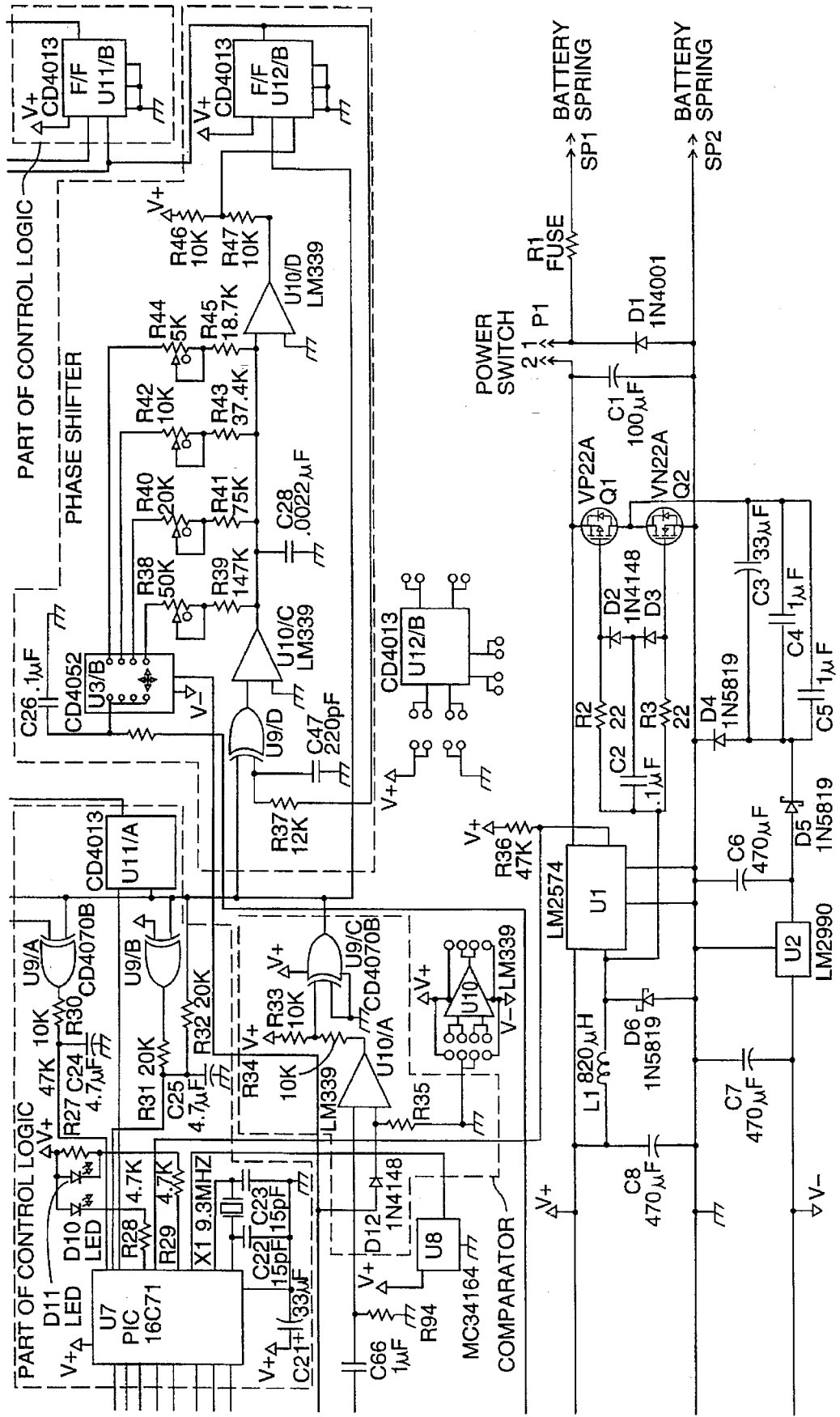

FIG. 2 is a block diagram illustrating an embodiment of the metal detector of FIG. 1 in more detail. The control logic 40 issues control signals 42 and 60 to actuate switches in the transmit drive block 44. The switches control the issuance of sinusoidal drive signals 50 at different frequencies to the transmit coil 52. In this particular embodiment, the transmit drive block 44 provides periodic signals at four different frequencies. The number of signals issued at different frequencies can vary, but the drive signals should preferably include signals at two or more different frequencies.

The transmit drive block 44 provides a multiplexed, 4 frequency signal 50 in response to control signals from the control logic 40. The transmit drive block provides each of the four frequencies for a time sufficient to allow the sample and hold blocks 80, 82 to capture the phase detector outputs 76, 78. For each of the four frequencies, the transmit drive block provides a signal for sufficient time to capture output from the two phase detectors in the sample and hold blocks. The transmit drive block then switches to the next frequency.

The control logic 40 also supplies control signals 46 to a capacitor bank 48. The capacitor bank 48 includes a bank of capacitors used to tune the coils, as well as switches to switch among the different capacitors. The capacitor bank 48 is coupled to the transmit coil 52 so that it can tune the coil for the appropriate frequency. To reduce power consumption, the transmit 52 is tuned to resonate at frequencies corresponding to the drive signals applied to the transmit coil. It is not necessary to tune the coils in this manner; however, tuning the coils makes them more sensitive and reduces the required drive current.

Specific exemplary frequencies at which the transmit coil is driven are: 33.21 kHz, 11.07027 kHz, 3.69009 kHz, and 1230.03 Hz. However, any of a number of different frequencies can be used. Preferably the frequencies should range from around 400 Hz up to about 100 kHz.

Higher transmit current and lower receive gain can be used to alleviate noise. Increased field strength will cause a larger return from targets buried in the ground and make it possible to reduce the receive gain. It is this gain reduction that makes the instrument less sensitive to external noise. Once the field strength is increased, receive coil turns or pre-amp gain can be reduced in order to reduce noise.

Signals 56 induced in the receive coil 54 are transferred to the switched pre-amp 58. The switched pre-amp 58 includes band-pass filters, and control switches corresponding to the signals driven on to the transmit coil. Band-pass filters are used to capture the received signal for the frequency of the current drive signal on the transmit coil. The control logic 40 controls the operation of the switched pre-amp 58 by issuing control signals 60 to switches within the switched pre-amp.

The switched pre-amp provides a signal 62 representing the induced signal in the receive coil to the X and Y phase detectors 64, 66. To control the X and Y phase detectors, this embodiment includes a comparator 68 and a phase shifter 70. The transmit drive 44 provides the drive signal 50 to the transmit coil and to the comparator 68. The comparator 68 is used to generate a square wave, which is then used to drive the X phase detector. The output 72 of the comparator 68 is also applied to the phase shifter 70 and shifted 90°. This shifted signal 74 is then used to drive the Y phase detector 66. Since the phase shifter is set to 90°, the X and Y phase detectors are in quadrature. The X and Y phase detectors measure the received signal at two different phases.

The outputs of the X and Y phase detectors 76, 78 are then supplied to corresponding sample and hold blocks 80, 82. In this embodiment, each sample and hold block includes sample and hold circuitry for each of the four frequencies at which the transmit coil is driven. As shown in FIG. 2, the microprocessor and control logic 40 supplies four control signals 46 to both the X and Y sample and hold blocks. The control logic also provides control signals 84a, 84b to inhibit sampling during transitions from one frequency to the next.

This embodiment includes a multiplexer 90, coupled to the sample and hold blocks, to select among the sampled signals 86, 88 at different frequencies. The output of the multiplexer is a selected output 92 of the X and Y sample and hold blocks. This output is applied to an analog to digital converter 94 to convert the analog signal sampled from the phase detectors to a digital signal 96. The digital signal is then applied to a digital signal processor for additional processing.

The digital signal processor 98 is responsible for both ground subtraction and target evaluation in this embodiment. Digital signals from the analog to digital converter are first conditioned (100) and then supplied to the ground subtraction subsystem 104. The processing involved in ground subtraction is described in more detail below. In general, the ground subtraction subsystem subtracts two corresponding components of received signals measured at two different frequencies to eliminate the portion of the received signal due to the ground response. More specifically, the X phase detector 80 is designed to measure a component of a received signal that is substantially in phase with the response due to ground. By measuring the X component of a receive signal at two different frequencies and then subtracting the components, the response due to ground can be removed substantially, if not entirely.

The target evaluation subsystem 108 represents the portion of the programmed signal processor responsible for target evaluation. In this embodiment, inputs to the target evaluation subsystem include ground excluded components from the ground subtraction portion of the processor as well as the Y component in the receive signal. In response to receiving these measured components of the receive signal, the target evaluation subsystem extracts additional data used to identify the material type of the target. Alternative methods and systems for target evaluation are described in more detail below.

The output of the target evaluation portion of the processor is manipulated so that it can provide a meaningful visual or audio output to the user. In this embodiment, visual data is displayed to the user through a conventional display device such as a dot matrix Liquid Crystal Display. Audio data is also conveyed to the user via a conventional audio output device such as a speaker. A variety of alternative output devices can be used for the same purpose.

FIG. 3A–D is a schematic diagram illustrating a specific embodiment of the metal detector of FIG. 2. Sections of the diagram are enclosed in dashed lines and labeled to illustrate how parts of the schematic diagram correspond to the components of FIG. 2. The circuit components are also labeled to identify their part numbers and values where appropriate.

The embodiment of FIG. 2 includes additional components used to process the output of the X and Y sample and hold circuits. Any of a number of commercially available components can be used to implement the multiplexer 90 and the A/D converter 94. The digital signal processor (DSP) also can be implemented using a variety of commercially available components. One suitable processor is the TMS320C203 from Texas Instruments.

In this embodiment, the ground subtraction subsystem 104 refers to part of the metal detection system used to remove components of the received signals caused by the background environment. This metal detector is designed to remove a component of the response signals due to the ground, e.g. mineralized soil. However, the methods of subtracting background components apply to other background environments as well.

The ground subtraction subsystem can remove background components whether or not the background response changes with frequency. As described above, the phase detectors measure components of the received signals at two phases for each frequency. The ground subtraction system removes the background response from these components by subtracting selected signal components from each other. When the background response changes with frequency, the ground subtraction block adjusts the gain and/or phase of the detection axes to compensate for the change in the background component. In this specific embodiment, the ground subtraction subsystem performs these adjustments so that the ground component at one axis is zero or substantially zero and the ground component at the other axis is the same, or substantially the same, at each frequency. It is also possible to adjust the phase at which each phase detector measures the response signal and adjust the gain applied to the measured components to achieve the same effect.

In this embodiment, the phase detection axes can be adjusted to facilitate removal of the background response. One phase axis is aligned to be in quadrature with the phase of the background response. The other phase axis is then set in phase with the background response.

The process of setting the phase detection axes occurs as follows. First, the user holds the search loop away from the ground and prompts the detector to measure any phase detector offsets. The phase detector offsets are cancelled or recorded such that only the change due to objects in proximity of the search loop are measured.

Next, the user places the search loop on the ground (away from targets) and prompts the detector again. The phase of each pair of axes is adjusted for zero on the Y axis (ground balanced).

Since the axes are 90° apart, balancing the Y axis forces the X axis to be in phase with the ground. Overall gain (for both X' and Y') is then adjusted to match the X channel ground reading at each frequency (X' is held constant and X", X''', etc. are adjusted to match).

The background response is removed by subtracting the components measured at the X axes for two signals at different frequencies. Since the Y component is in quadrature with the phase of the background response, it has essentially no ground component. The X component, on the other hand, is in phase with the ground response at each frequency. Therefore, it includes a component due to any target as well as the background component. When the background component does not change with frequency, the background component can be removed by subtracting the components measured in the X axes at different frequencies. When the background component does change with frequency, however, the X and Y detection axes are adjusted. In determining the corrected axes, the gain applied to both detection axes is adjusted such that the background component is substantially equal at each frequency. The background component can then be removed by subtraction.

The ground subtraction system can be implemented using strictly hardware or using a combination of hardware and a programmed microprocessor. In the illustrated embodiment, a programmed data processor performs ground subtraction processing. To describe this processing in more detail, I begin by explaining the parameters and data used in computing ground excluded components of the received signal.

In the example to follow, the phase detection axes are adjusted to compensate for changes in the background response. The components measured in these background "adjusted" or "corrected" detection axes can then be processed to remove the background response.

The received signal can be expressed in terms of its X and Y components, which correspond to components of the received signal that project into the purely reactive (X) axis and the purely resistive (Y) axis. Assume $(X_1,Y_1)$ and $(X_2,Y_2)$ are the components of the received signal due to the target at two discrete frequencies. Also assume that $(G_{X_1}, G_{Y_1})$ and $(G_{X_2},G_{Y_2})$ are the components of the received signal due to the background at the same two frequencies. With these assumptions, the components of the received signal due to both the background and the target can be expressed by Equations 1 and 2 for the two different frequencies.

$$RS_1=(X_1+G_{X_1},Y_1+G_{Y_1}) \quad (1)$$

$$RS_2=(X_2+G_{X_2}, Y_2+G_{Y_2}) \quad (2)$$

$$G_1=(G_{X_1}, G_{Y_1}) \quad (3)$$

$$G_2=(G_{X_2}, G_{Y_2}) \quad (4)$$

Equations 3 and 4 represent the components of the received signal due to the background only at the respective frequencies. While this example refers to signals at two different frequencies, the same principles apply where additional signals at different frequencies are transmitted and received.

The ground subtraction system processes the outputs of the X and Y phase detectors (the X and Y components) using parameters, or "constants" derived from the background responses measured at the different frequencies. These parameters are defined in equations 5–10 below.

$$K_1 = \left(\frac{G_{Y_1}}{G_{X_1}}\right) \quad (5)$$

$$K_2 = \left(\frac{G_{Y_2}}{G_{X_2}}\right) \quad (6)$$

$$K_a = \frac{1}{(1+K_1^2)^{1/2}} \quad (7)$$

$$K_b = \frac{1}{(1+K_2^2)^{1/2}} \quad (8)$$

$$K_{G_1} = 1 \quad (9)$$

$$K_{G_2} = \frac{(G_{X_1}^2 + G_{Y_1}^2)^{1/2}}{(G_{X_2}^2 + G_{Y_2}^2)^{1/2}} \quad (10)$$

In this example, the scaling factor, $K_{G_1}$, is set to one, and the background components for signals at other frequencies are scaled relative to it.

Using the parameters described above, the background corrected components for signals at different frequencies can be computed according to the following equations:

Adjusted axes for $F_1$:

$$X'=(K_{G_1})(K_a)(X+(K_1)(Y)) \quad (11)$$

$$Y'=(K_{G_1})(K_a)(Y-(K_1)(X)) \quad (12)$$

Adjusted axes for $F_2$:

$$X''=(K_{G_2})(K_b)(X+(K_2)(Y)) \quad (13)$$

$$Y''=(K_{G_2})(K_b)(Y-(K_2)(X)) \quad (14)$$

X', Y', X", and Y" of equations 11–14 represent the components of the received signal measured at the adjusted phase detection axes.

The background components measured using these adjusted phase detection axes can then be expressed as set forth in equations 15 and 16.

$$G'_1 = (G'_{X_1}, G'_{Y_1}) \quad (15)$$

$$G''_2 = (G''_{X_2}, G''_{Y_2}) \quad (16)$$

The projection of the ground response onto each adjusted Y phase detection axis is zero or about zero as shown in equation 17.

$$G'_{Y_1} = G''_{Y_2} = 0 \quad (17)$$

The projection of the ground response onto each adjusted X axis is equal or about equal as shown in equation 18.

$$G'_{X_1} = G''_{X_2} \quad (18)$$

The total received signal (ground plus target), as measured on the adjusted axes, is given by equations 19 and 20.

$$RS_1 = (X'_1 + G'_{X_1}, Y'_1) \quad (19)$$

$$RS_2 = (X''_2 + G''_{X_2}, Y''_2) \quad (20)$$

Since the projection of the ground response on the adjusted X axis for each frequency is equal, the remaining background can be removed by subtracting X data for any two frequencies. Subtracting these components produces a background excluded difference, which can then be used to characterize the target.

Figure 4:
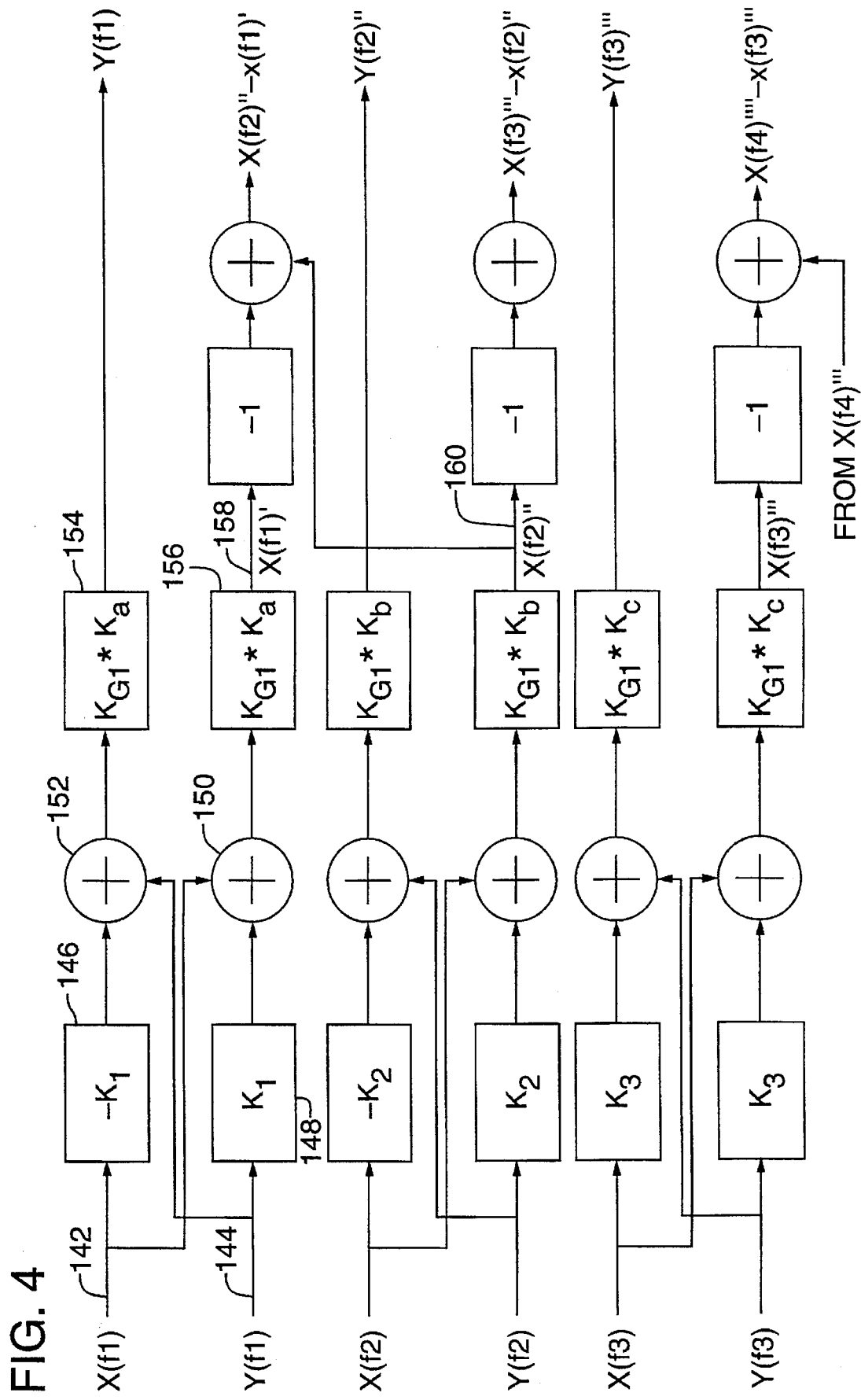
FIG. 4 is a block diagram illustrating the ground subtraction subsystem in an embodiment of the invention.

FIG. 4 is a block diagram illustrating the ground subtraction subsystem in more detail. FIG. 4 illustrates ground subtraction processing for signals at three different frequencies: f1, f2, and f3. The results of measuring the components of fourth signal at frequency, f4, are used to compute a background excluded difference as well. Additional stages can be added for signals at different frequencies.

In the illustrated embodiment, the detector transmits and receives signals at four different frequencies, but more stages can be added to extend the frequency range and improve the resolution of the resulting data.

The blocks shown in FIG. 4 implement the processing reflected in equations 11–14 listed above. An example will illustrate the operation of the ground subtraction subsystem. The X and Y components (142, 144) of a signal at frequency f1 are multiplied by $-K_1$ and $K_1$ (146, 148), respectively. The result from the first block (146) is then added to the Y component (144). Similarly, the result from the second block (148) is then added to the X component (142). The result of both of the add steps (150, 152) is then multiplied by another constant, $K_{G1}*K_a$, as shown (154, 156). The result of multiplying the output of the add operation (150) by $K_{G1}*K_a$ is the adjusted X component, X(f1)'(158). To compute the background excluded difference, the adjusted X component, X(f1)', is subtracted from a second adjusted X component, X(f2)'(160). The remaining blocks perform this computation in a similar fashion. The parameter, Kc, is computed using a similar approach as with Ka and Kb described above in equations 7 and 8.

While we have illustrated an implementation using a programmed data processor, the process of removing background responses can be implemented in a number of alternative ways. For example, the background subtraction system can be implemented using hardware components to adjust the phase axes and the gain applied to the output of the phase detectors. In this alternative implementation, the user manually adjusts the axes of the phase detectors at each frequency to set-up the detector for a particular type of background. In addition to adjusting the phase axes, the user also adjusts the gain such that the ground response is substantially equal at different frequencies. This implementation provides an output signal, either audible or visual, enabling the user to match the ground response at each frequency. The X components, adjusted appropriately by the gain set by the user, can then be subtracted to compute a background excluded difference.

Other variations to the implementation are also possible. The phase detectors are set to be in quadrature in the illustrated embodiment with one phase 90° out of phase with the ground response. However, the X and Y phase detectors can be adjusted to a variety of different phases. The received signal can also be measured in polar form using a phase meter to measure phase shift and a synchronous rectifier to measure magnitude. The processing of the ground subtraction subsystem can be performed in polar form, or polar to rectangular conversion can be performed to compute the background excluded components as described above.

The components measured in the phase detectors can be processed using analog hardware elements, discrete logic elements or a programmed data processor to compute background excluded components by subtraction. As such, I do not intend to limit the scope of my invention to specific implementation of the phase detectors or the processing of phase detector outputs.

After processing the X and Y components, the ground subtraction subsystem transfers background excluded components to the target evaluation subsystem. There are a number of different target evaluation techniques that can be applied to the background excluded components to discriminate among different types of targets.

In one approach, the background excluded components at the different frequencies can be compared with background excluded components of known targets. I refer to this approach as mapping because background excluded data for stored targets is mapped into memory according to current ground conditions and compared with unknown targets. This approach can be used in environments where the background response does or does not change with changing frequency, subject to the issues described below.

As conceptual background for this approach, consider the following example. Assume each X phase detection axis is purely reactive and that each Y axis is purely resistive. Also assume that the x axis outputs are subtracted to produce the background excluded difference. In this case, a non-ferrous target at a fixed distance will yield the same outputs, whether located in the ground or not. Further, different targets will produce different outputs as long their respective resistive to reactive ratios are different.

In cases where the phase detection axes are adjusted for a changes in the background response over frequency, a non-ferrous target at a fixed distance will still yield the same background excluded data whether the target is located in the ground or not. Again, different targets will yield different background excluded data as long as their resistive to reactive ratios are different. However, the answer for the same target is different at each different ground setting. Although background excluded data remains proportional, it changes with target distance and must be normalized to one amplitude.

For both changing and unchanging background, the normalized background excluded data is unaffected by motion of the search loop relative to ground because the background response is removed by subtraction. In one embodiment, the target evaluation subsystem performs target discrimination using a mapping approach as set forth below.

As noted above, the normalized background excluded data is unique for different targets to the extent that the resistive to reactive ratio is unique for those targets. The background excluded components, therefore, can be used to characterize the target type. The normalized background excluded components are the same for a given target whether the target is buried in the ground or not. Although the search loop may of course be moved as the user searches for metal targets in the ground, the background excluded data can be generated without requiring motion of the search loop relative to the background in which targets are located.

After computing the normalized background excluded components, the target evaluation subsystem can then compare the normalized background excluded components for known and unknown targets and identify a target type based on the proximity of this data to data characterizing recorded targets.

If the background response changes as a function of frequency, the approach described above should be modified because a single target will produce different background excluded response data for different ground settings. This problem arises because different phase and gain settings are used to compensate for changes in the background response.

The example used above will illustrate the problem for detectors that adjust the phase detection axes to account for changes in the background response. Background excluded data for two frequencies is $(X_2''-X_1')$, $Y_2''$, and $Y_1'$. For additional frequencies, the background excluded data includes: $(X_3'''-X_2'')$, $Y_3'''$, and $Y_2''$. The normalized background excluded data is usually unique for different targets, which makes it beneficial in target evaluation. However, it can be different for the same target in different background environments, which makes target evaluation more difficult.

To address this issue, the stored target data can be mapped to a desired pair of axes based on the relationship between X" and Y", X' and Y', and the X and Y axes. This enables the detector to calculate a new set of targets based on stored readings each time the user balances to a new ground condition.

Figure 5:
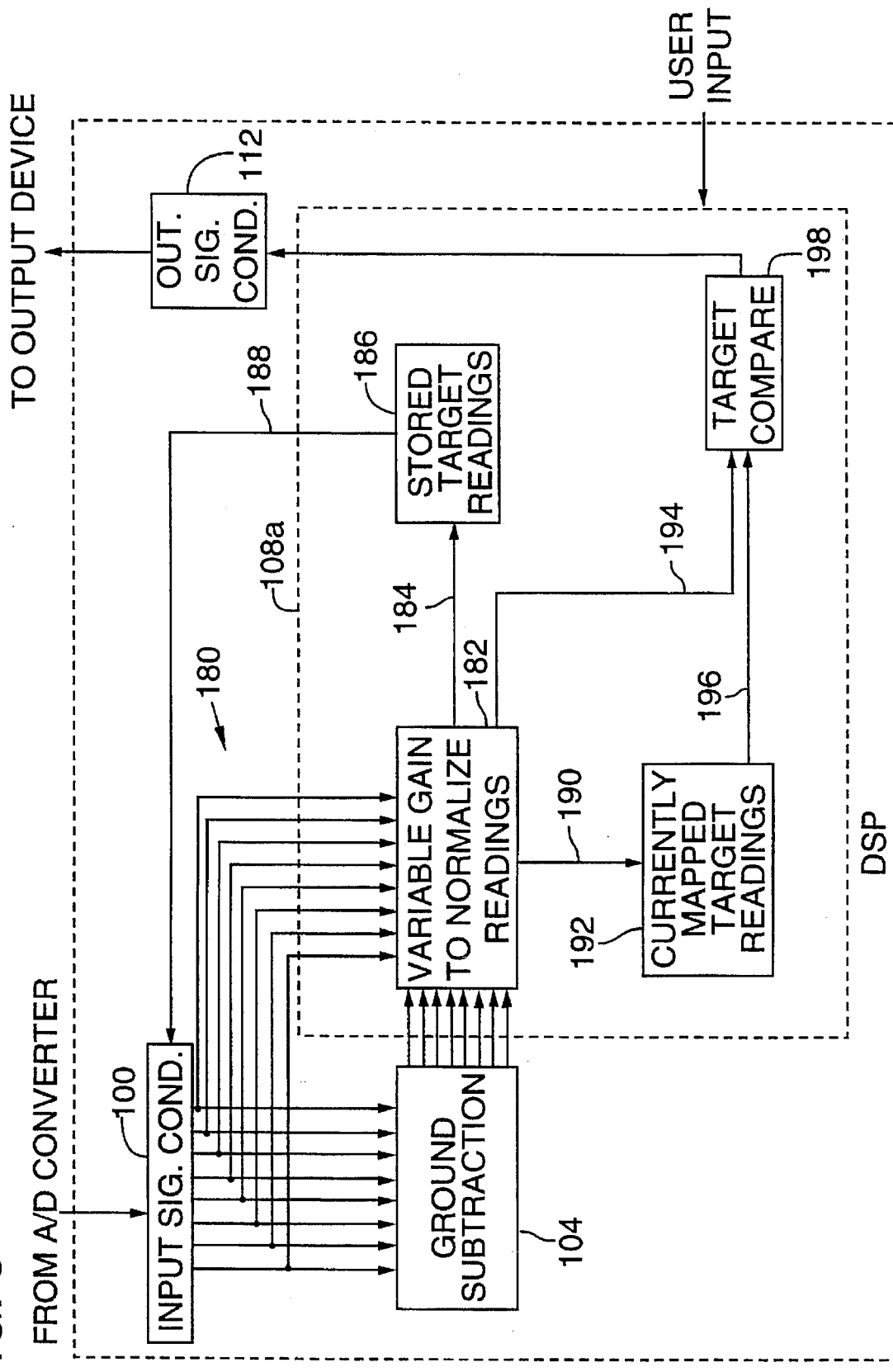
FIG. 5 is a block diagram illustrating the target evaluation subsystem in an embodiment of the invention.

FIG. 5 is a block diagram illustrating one implementation of the target evaluation subsystem. In this approach, the subsystem 108a compares data extracted for unknown targets with data mapped from a number of known targets. To identify the unknown target, the subsystem determines whether the incoming data matches or comes within a predefined tolerance of mapped target data. The stored target data used for mapping can include standard target data preset in memory as well as data added by the user.

This implementation includes three primary data paths. A first data path is used to store component data readings for known targets. To store this form of target data, the user selects an option on the input device of the detector to place it in the proper mode, and then passes the "known" target in front of the search loop. The measured response signals (180), including a response due to the ground when ground is present, are transferred from the input signal conditioning block through the normalizing block. The normalized data is then transferred to target data storage (186). Since normalized phase detector data is being stored (no ground rejection), component data should be saved in the absence of ground. Both user saved and standard targets remain here until ground settings are updated.

The second data path is used to adjust the stored target data for the background environment to be searched. After the detector is ground balanced as explained above, stored target data is adjusted according to the background environment. The target evaluation subsystem performs this adjustment because the same target can yield different background excluded components in different background environments.

Referring to FIG. 5, the stored target data (188) is routed through the input signal conditioner 100 and ground subtraction subsystem 104 and normalized again (182). The reprocessed target data (190) is then saved as "currently mapped" (192). Since the "currently mapped" target data is modified by ground subtraction, it can be compared with background excluded components for unknown targets in the background environment currently being searched. In this embodiment, the process of adjusting the stored target data is performed each time the ground settings for the detector are updated for the background environment. For each update of the ground settings, a new target map is generated and saved.

The third data path is used to identify unknown targets while searching in a background environment. As the user hunts, digital data from the A/D converter passes through the input signal conditioner 100, and the ground subtraction subsystem 104 computes background excluded components. The background excluded data is then normalized (194) and compared with mapped targets (196) in the target compare block (198). When a match occurs, the identity of the target is then output via an output device. If no match occurs, a "rejection" or "unknown" indication is output via the output device. Any target not in the map, whether good or bad, falls into this "unknown" category.

As an alternative to mapping, a plot of the background excluded components can be displayed to the user. Based on the shape of this plot, the user can discriminate among different types of targets.

Figure 6:
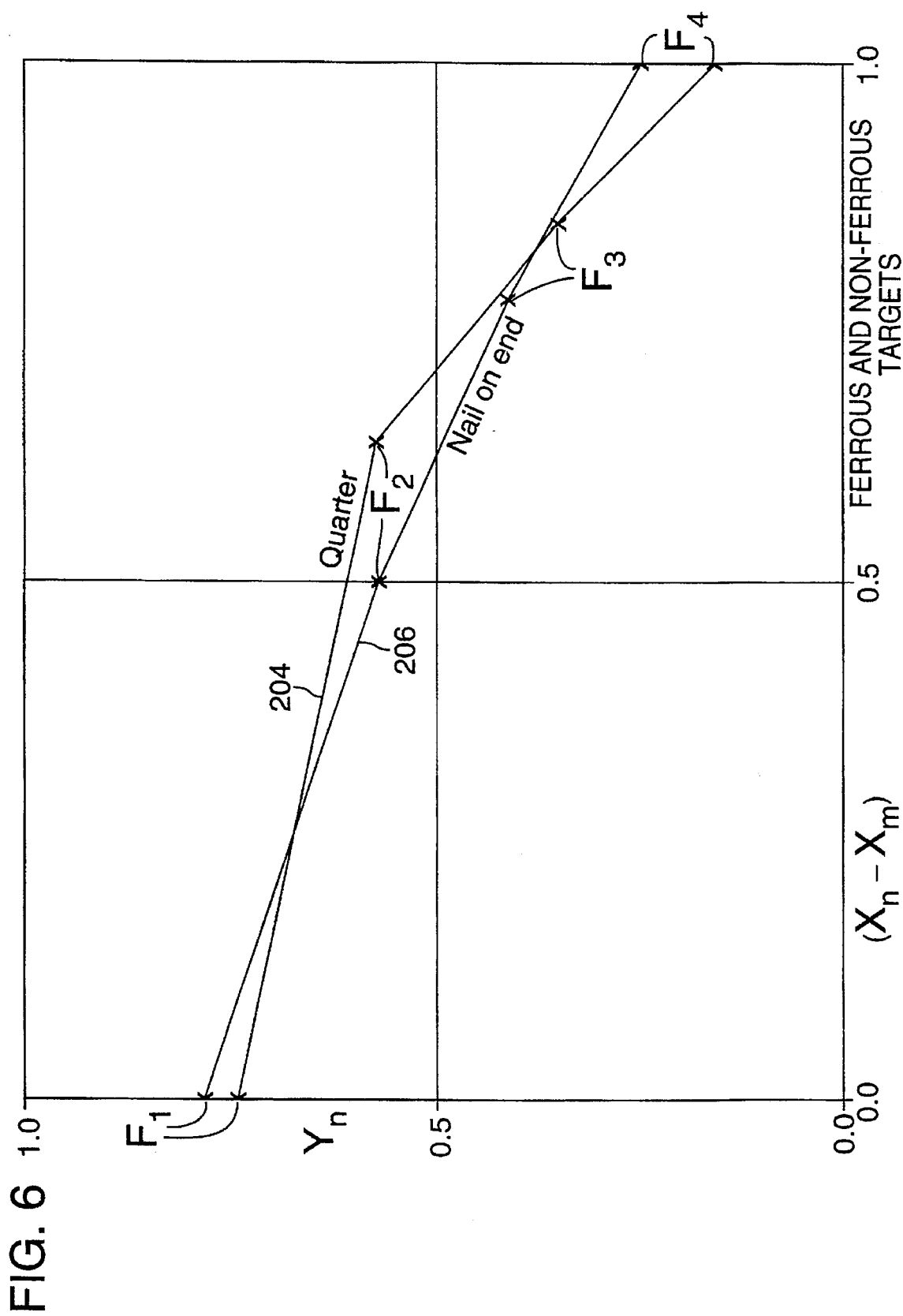
FIG. 6 is a plot of background excluded components for two different targets.

FIG. 6 is a plot of background excluded differences $(X_n-X_m)$ and Y components $(Y_n)$ at four different frequencies for two different targets. More precisely, FIG. 6 illustrates a plot of $(0,Y_1)$, $(X_2-X_1,Y_2)$, $(X_3-X_1,Y_3)$, and $(X_4-X_1,Y_4)$, for a quarter (204) and a nail on end (206), measured at 4 different frequencies. Valuable targets can be discriminated from other materials based on this type of plot. Note that the plots span the same quadrants and even overlap. Since the plots for different targets are not easily separated in some cases, this approach is not a preferred approach.

In an alternative embodiment, the detector can plot the background excluded components measured in an environment where the phase detection axes are adjusted to compensate for changes in the background response. However, the same target plotted for different ground settings usually results in different plots. If this data is plotted and displayed for the user, the user should know how the shape of a plot for desired targets changes for different background environments.

In another alternative embodiment, the target evaluation subsystem uses a target model to evaluate the material type of a target. The target model enables the target evaluation subsystem to provide a continuous range of output values for unknown targets. This is different from target mapping, where the target evaluation subsystem only identifies whether data for an unknown target is within predefined tolerances of known target data. An example will help illustrate this distinction.

One example of a continuous range of output values is the resistive to reactive ratio. I refer to this range of values as the resistive to reactive continuum. The resistive to reactive ratio for any target falls at a point along this continuum. In contrast to the mapping approach, a value representing this ratio can be computed and presented to the user for any unknown target. The user can assess the material type of a target based on the computed ratio.

When the background response is removed using subtraction as set forth above, the resistive to reactive ratio of a target cannot be computed simply by dividing the background excluded components because the output of the ground subtraction block comprises a background excluded difference or differences, e.g. $X_2-X_1$ and one or more Y components. Further processing is required to compute a resistive reactive ratio. In addition, a target model can be devised to process the background excluded components and produce an output value along a continuous range of values. The user or the detector can use this output value to identify an unknown target.

A model of a non-ferrous target behavior can provide a continuum along which unknown targets can be measured relative to known targets. One example of a target model is to approximate a non-ferrous target as a resistor and inductor coupled in parallel (a resistor loaded coil). As shown below, the X and Y components of a response signal can be expressed in terms of a resistance R, and inductance L, using this model.

$$X = \frac{R}{1 + \left(\frac{R}{L\omega}\right)^2} \quad (21)$$

$$Y = \frac{\frac{R^2}{L\omega}}{1 + \left(\frac{R}{L\omega}\right)^2} \quad (22)$$

$$\frac{X}{Y} = \frac{L\omega}{R} \quad (23)$$

If L and R are assumed to be constant over frequency, a resistive to inductive ratio can be computed using equation 23. This is done by making equation 23 specific to each frequency, then subtracting resulting equations and factoring out L/R. The result is shown in equations 24 and 25 below:

$$\frac{L}{R} = \frac{X_2 - X_1}{Y_2(\omega_2) - Y_1(\omega_1)} \quad (24)$$

$$\frac{L}{R} = \frac{X_3 - X_2}{Y_3(\omega_3) - Y_2(\omega_2)} \quad (25)$$

This method provides a resistive to inductive ratio. The resistive to inductive ratio can easily be converted to a resistive to reactive ratio by multiplying it by frequency (i.e. $\omega^* L/R$). Because this method is based on the assumption that L/R does not change, it suffers from limitations. However, the information that is provided does not require the user to move the search head relative to the ground as in the case of conventional single frequency metal detectors. Also, because no filtering is required, more usable data is available under certain operating conditions.

The limitation of the model above is that L/R changes with frequency. Since this does not agree with the original assumption, the L/R value from the above equations can be incorrect. For targets that change very little at the frequencies being used, the error is negligible. But for targets that change significantly with frequency, the error is substantial.

A model that more accurately represents the behavior of the target can provide more information about the target type. A model that includes skin effect has proved more accurate and provides more information about the target.

Because of a phenomena known as the skin effect, the resistance, R, varies with frequency. The skin effect refers to the behavior of a conductor in which current density in the conductor decreases toward its center with increasing frequency. This effect causes the resistance $R_{ac}$ to rise with increasing frequency. The ratio of the DC Resistance to the AC Resistance is set forth below:

$$\frac{R_{ac}}{R_{dc}} = mr = \left[ \frac{8(\pi^2)(10^{-7})(F)(\mu r)(r)}{P} \right]^{1/2} \quad (26)$$

Where:
r=Radius of the conductor in inches.
F=Frequency.
$R_{ac}$=Resistance at frequency "F".
$R_{dc}$=Direct current resistance
μr=Relative permeability of conductor material (μr=1 for copper and other nonmagnetic materials).
P=Resistivity of conductor material.

This expression assumes an isolated straight solid conductor of circular cross section, constant permeability and resistivity, and is accurate when $R_{ac}/R_{dc}$ is large compared to $R_{dc}$. While this expression is not directly applicable to metal objects of varying shapes, the expression for the ratio of $R_{dc}$ to $R_{ac}$ can be used to derive a skin constant K. As a first approximation of K, the square root of the frequency can be factored from the numerator of equation 26, leaving several parameters.

While the specific parameters forming a part of K cannot be computed individually without knowing more about the target, K is still generally descriptive of the size and shape of the target. Because permeability varies little for non-ferrous targets and K is a function of diameter/resistivity, bigger thicker targets will tend to have a higher K than smaller thinner targets. As such, the skin constant provides a means of size and shape discrimination. The skin constant can also allow discrimination between targets with similar peak frequencies, even if their relative depth in the ground masks the size difference.

Unfortunately, equation 26 is only accurate when the ratio of AC to DC resistance is large. The actual expression for this ratio must approach unity as the frequency approaches zero. Based on this observation and observations of plots of the skin effect near unity, I arrived at equation 27 as a substitute for equation 26. Equation 27 approaches unity as the frequency approaches zero, and it closely approximates equation 26 at higher frequencies. Plots of this function are very similar to plots representing actual skin effect.

$$\frac{R_{ac}}{R_{dc}} = mr = 1 + K(F^{1/2}) \quad (27)$$

The relationship of equation 27 can be used to extract the ratio of DC resistance to inductance as well as a skin constant, K. Because K relates to the size and shape of the target, a target model incorporating skin effect can be used to provide additional data about the size and shape of an unknown target.

Skin effect can be incorporated into a target model by making equation 23 specific to each frequency. Equation 27 can then be used to relate the resistance at each frequency as shown below. $R_1$ and $R_2$ represent $R_{ac}$ at frequencies F1 and F2 respectively.

$$\frac{X_1}{Y_1} = \frac{L\omega_1}{R_1} \quad (28)$$

$$\frac{X_2}{Y_2} = \frac{L\omega_2}{R_2} \quad (29)$$

$$R_1 = R_{dc}(1 + K(F_1^{1/2})) \quad (30)$$
$$R_2 = R_{dc}(1 + K(F_2^{1/2})) \quad (31)$$

Since equations 28 and 29 are expressed in terms of radian frequency, assume that K in equations 30 and 31 is adjusted such that:

$$R_1 = R_{dc}(1 + K(\omega_1^{1/2})) \tag{32}$$

$$R_2 = R_{dc}(1 + K(\omega_2^{1/2})) \tag{33}$$

Once the AC resistances are defined in terms of $R_{dc}$, $R_{dc}/L$ can be factored out as follows:

$$\frac{L}{R_{dc}} = \frac{X_1(1 + K(\omega_1^{1/2}))}{(Y_1)(\omega_2)} \tag{34}$$

$$\frac{L}{R_{dc}} = \frac{X_2(1 + K(\omega_2^{1/2}))}{(Y_2)(\omega_2)} \tag{35}$$

If X and Y data are available independently at both frequencies, as before ground is subtracted, then $R_{dc}/L$ and K can be solved for directly. The result is given below:

$$K = \frac{\left[\dfrac{X_1}{Y_1 \omega_1} - \dfrac{X_2}{Y_2 \omega_2}\right]}{\left[\dfrac{X_2}{Y_2 \omega_2^{1/2}} - \dfrac{X_1}{Y_1 \omega_1^{1/2}}\right]} \tag{36}$$

$$\frac{L}{R_{dc}} = \frac{\left[\dfrac{1}{\omega_1^{1/2}} - \dfrac{1}{\omega_2^{1/2}}\right]}{\left[\dfrac{Y_1}{X_1}\omega_1^{1/2} - \dfrac{Y_2}{X_2}\omega_2^{1/2}\right]} \tag{37}$$

Since filters are used to remove the ground in a motion discriminating metal detector, X and Y are available independently. In such a system, the target model provides the additional size and shape information described above using only two frequencies. $L/R_{dc}$ and K can also be successively approximated by inserting values for K in equations 34 and 35 until $L/R_{dc}$ for each equation converge.

Figure 7:
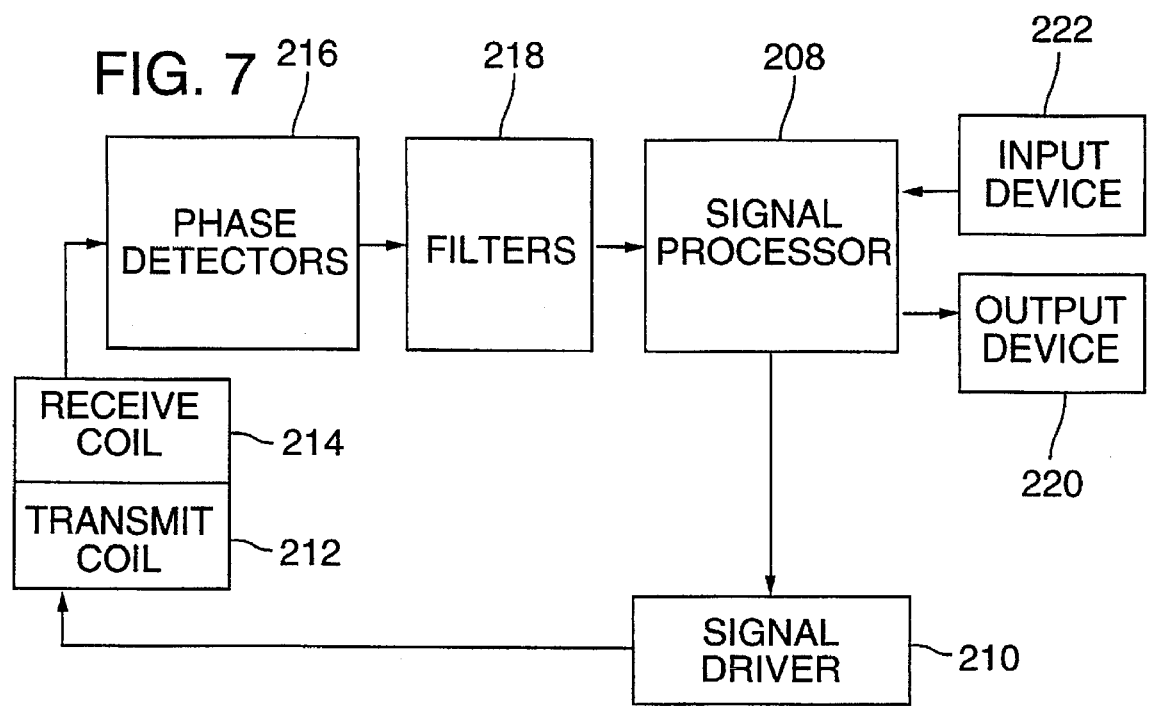
FIG. 7 is a block diagram illustrating an alternative embodiment of the invention that includes filters to remove the background response.

In one embodiment, a motion discriminating metal detector that incorporates the target model can be implemented as shown in FIG. 7. The signal processor 208 provides signals to operate the signal driver 210. The signal driver drives the transmit coil 212 with sinusoidal drive signals of different frequencies. These frequencies can be provided either simultaneously or in sequence.

Signals induced in the receive coil 214 are applied to the phase detectors 216. The phase detectors measure the received signals at two different phases for each frequency. Again, this can be done simultaneously, or in sequence.

Signals measured by the phase detectors 216 are provided to the filters 218, which are optimized for the removal of background components from target data as coils 212 and 214 are swept. Examples of filter types can include, but are not limited to, high-pass or band-pass filters or combinations of each on each phase detector. Digital filters of these types can alternately be implemented within the signal processor 208 using finite impulse response (FIR), infinite impulse response (IIR), or other digital signal processing methods.

Background filtered data, at two phases for each frequency, is provided to the signal processor 208. The signal processor computes $L/R_{dc}$ and K either directly using equations 36 and 37, or by successive approximation using equations 32 and 33. This data is then provided to the user via the output device 220. In the case of a digital filter implementation, data from the phase detectors 216, at two phases for each frequency, is provided to the signal processor 208. This data is then filtered and $L/R_{dc}$ and K are computed, within the signal processor, as described above. And again, the resulting data is provided to the user via the output device 220.

The input device 222 allows the user to select between various operating modes. For example, the user can select between a discriminating mode as described above and a pinpointing mode where only target intensity is provided to the output device.

X and Y data in the target model equations are indicative of purely reactive and resistive measurements respectively. One method to achieve this is to set the two different phases measured at each frequency by the phase detectors 216 to be reactive and resistive. Another method is to mathematically manipulate the data at two phases, whether filtered or unfiltered, to produce the desired X and Y components before computing $L/R_{dc}$ and K.

In another embodiment, a motion discriminating metal detector using the target model can be implemented as detailed in FIG. 2. In this case, the DSP 98 can be programmed to implement the digital filters and processing to compute $L/R_{dc}$ and K as described above. This would replace the ground subtraction and target evaluation shown in block 98 of FIG. 2.

It may be desirable to update the output for $L/R_{dc}$ and K only when a target is present. This is commonly done in motion discriminators to reduce spurious outputs. One example would be to provide an additional ground balanced phase detector, filter its output, and update $L/R_{dc}$ and K only when the filtered output indicates a target. Such a system for presenting conventional discrimination data is given in U.S. Pat. Nos. 4,128,803 and 4,783,630 which are hereby incorporated by reference.

Another example would be to gate together filtered outputs of different phases to trigger the computation of $L/R_{dc}$ and the skin constant K when a target is within a desired range. A method for gating together filtered outputs of different phases is detailed in U.S. Pat. No. 4,514,692, which is hereby incorporated by reference.

Figure 8:
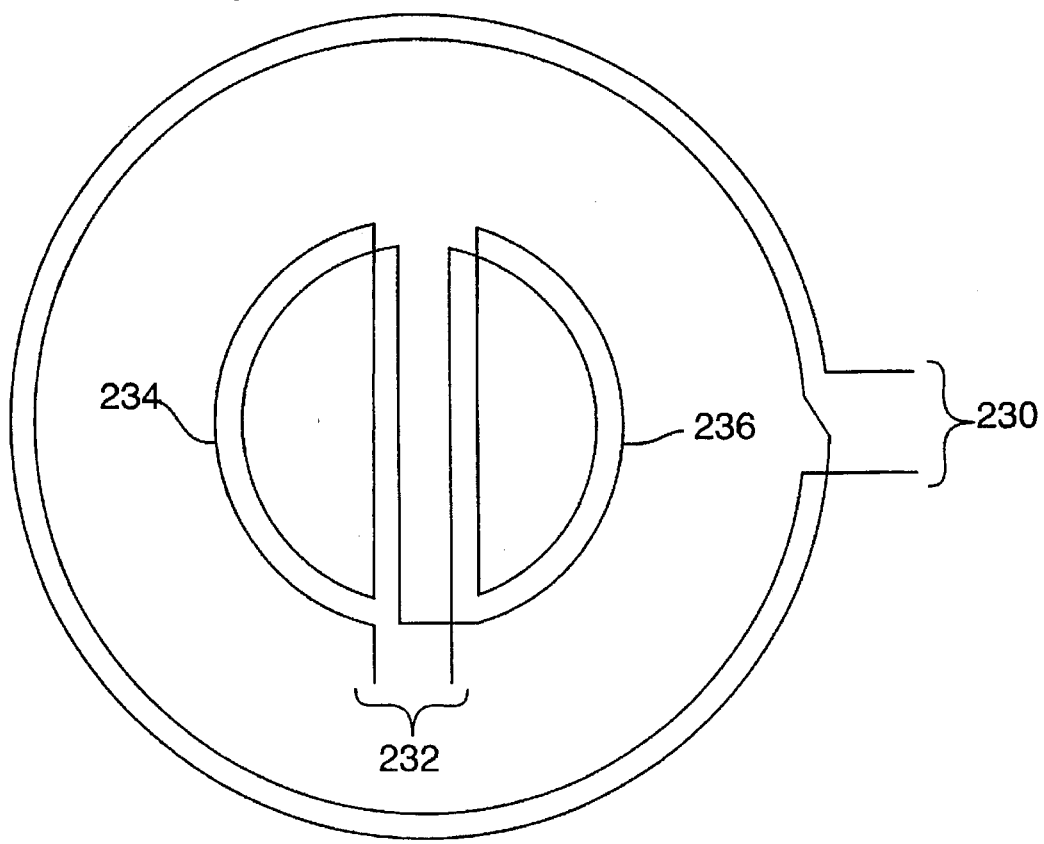
FIG. 8 is a diagram depicting a differential loop configuration.

In another embodiment, a metal detector that uses a differential loop and discriminates using $L/R_{dc}$ and K can be implemented as in FIG. 7. FIG. 8 is a diagram of one example of a differential search loop. The search loop includes a transmit coil 230 and a receive coil 232 comprised of a first coil 234 wound in one direction, and a second coil wound in the opposite direction. The first and second coils in the receive coil are configured such that if the same response signal is received in both coils, the net result is zero. This differential configuration can be used to remove the background response to the extent that it is the same in both the first and second coils 234, 236. The filters 218, (shown in FIG. 7) will further improve rejection of the background response when operated as a motion discriminator.

Hence, ground is rejected because the same ground is in front of each differential coil. Targets are detected by imbalancing either of the differential coils, producing independent X and Y data. Although FIG. 8 is one example of a differential loop, many configurations, with either differential transmit or receive coils, are possible. Under ideal conditions, the filters 218 can be omitted. This allows $L/R_{dc}$ and K to be computed, without motion, using only 2 frequencies. In real conditions however, the coil system is orientation sensitive as well as being sensitive to changes in the contour and strength of the ground. As such, this is not a preferred embodiment for a non-motion discriminator.

Although only 2 frequencies are necessary to compute $L/R_{dc}$ and K as described in the above embodiments, additional frequencies can be added to improve accuracy on a wider range of target types.

A target model based on skin effect can be used in environments where the background changes or does not change with frequency. In either case, the background excluded components can be processed to compute $R_{dc}/L$ and K. The expressions for a target model that includes skin effect are provided below. $R_1$ and $R_2$ represent $R_{AC}$ at frequencies $F_1$ and $F_2$, respectively.

$$X_2 - X_1 = L\left(\frac{Y_2(\omega_2)}{R_2} - \frac{Y_1(\omega_1)}{R_1}\right) \tag{38}$$

By substituting equations 32 and 33 into equation 38 and then factoring $R_{dc}$, the expression for $L/R_{dc}$ in an unchanging ground becomes:

$$\frac{L}{R_{dc}} = \frac{X_2 - X_1}{\frac{Y_2(\omega_2)}{1 + K(\omega_2)^{1/2}} - \frac{Y_1(\omega_1)}{1 + K(\omega_1)^{1/2}}} \tag{39}$$

$$\frac{L}{R_{dc}} = \frac{X_3 - X_2}{\frac{Y_3(\omega_3)}{1 + K(\omega_3)^{1/2}} - \frac{Y_2(\omega_2)}{1 + K(\omega_2)^{1/2}}} \tag{40}$$

Equations 39 and 40 can be solved by using data extracted from signals at three different frequencies. With this data, the parameters $R_{dc}/L$ and K can be computed directly, or by successive approximation. Because of the complexity of the expression used to solve for the parameters directly, it may be preferable to use successive approximation.

A similar method can be used to compute $R_{dc}/L$ and K in background environments which change with frequency. Equations 11–14 can be used to relate the background excluded components measured in a changing ground to the X and Y components in the target model. Once this is done, an expression for $R_{dc}/L$ can then be derived as shown below.

Equations 41 and 42 express background excluded components in terms of the components measured with the X and Y phase detectors.

Since the data from the modified X axes is equal (equation 18), it must be subtracted to remove the background. Subtracting each side of equation 11 from equation 13 relates this modified X axis difference to the reactive and resistive axes (X and Y respectively). If equations 12 and 14 are then used to eliminate the Y axis terms, the result is as follows in equation 41.

$$X_2'' - X_1' + K_1 Y_1' - K_2 Y_2'' = \left(\frac{K_{G_2}}{K_b}\right) X_2 - \left(\frac{K_{G_1}}{K_a}\right) X_1 \tag{41}$$

In a similar manner, the X axis terms can be eliminated as shown in equation 42.

$$X_2'' - X_1' + \left(\frac{Y_2''}{K_2}\right) - \left(\frac{Y_1'}{K_1}\right) = \left(\frac{K_{G_2}}{K_b K_2}\right) Y_2 - \left(\frac{K_{G_1}}{K_a K_1}\right) Y_1 \tag{42}$$

These equations relate X or Y data between frequencies using the background excluded components and known constants. It is also possible to relate between X and Y data in a similar manner. Since these equations relate two data points, at least one data point for the target on the resistive or reactive (X or Y) axis must be known to characterize the target. In addition, since the axes were modified to remove a background response that changes with frequency, the target cannot be characterized using the modified axis definitions alone.

Since the target model defines L and R of a non-ferrous target in terms of its X and Y components, it can be used to eliminate the remaining variables and characterize the target. Using equation 23, the target model for two frequencies can be expressed as follows:

$$X_1 = Y_1 * L\omega_1/R_1 \text{ and } X_2 = Y_2 * L\omega_2/R_2$$

Where $R_1$ and $R_2$ are defined as in equations 32 and 33 to include skin effect.

If the above equations are inserted for $X_1$ and $X_2$ in equations 12 and 14 and $Y_1$ and $Y_2$ are factored out, the result is as follows:

$$Y_1 = \frac{Y_1'}{K_{G_1}(K_a)\left(1 - K_1\left(\frac{L\omega_1}{R_1}\right)\right)} \tag{43}$$

$$Y_2 = \frac{Y_2''}{K_{G_2}(K_a)\left(1 - K_2\left(\frac{L\omega_2}{R_2}\right)\right)} \tag{44}$$

These can then be inserted for $Y_1$ and $Y_2$ in equation 42 as shown below:

$$Z_1 = \frac{Y_2''}{K_b^2\left(\frac{R_2}{L\omega_2} - K_2\right)} - \frac{Y_1'}{K_a^2\left(\frac{R_1}{L\omega_1} - K_1\right)} \tag{45}$$

Where:

$$Z_1 = X_2'' - X_1' + K_1 Y_1' - K_2 Y_2'' \tag{46}$$

For an additional frequency equation 45 can be written as:

$$Z_3 = \frac{Y_3''}{K_b^2\left(\frac{R_3}{L\omega_3} - K_3\right)} - \frac{Y_2'}{K_a^2\left(\frac{R_2}{L\omega_2} - K_2\right)} \tag{47}$$

Where:

$$Z_3 = X_3''' - X_2'' + K_2(Y_2'') - K_3(Y_3''') \tag{48}$$

There is only one set of values for the resistive to reactive ratios ($R_n/L\omega_n$) which cause both Equations 45 and 47 to be true. If $R_{dc}/L$ and the skin constant K are used to generate these ratios, a singular solution can be found.

If $R_{dc}/L$ is factored out of equations 45 and 47, two quadratic equations result. These quadratic equations are shown as equations 49 and 53 below. Equations 50–52 define the parameters of the quadratic equation 49, and equations 54–56 define the parameters of the quadratic equation 53.

$$A_1\left(\frac{R_{dc}^2}{L^2}\right) + B_1\left(\frac{R_{dc}}{L}\right) + C_1 = 0 \tag{49}$$

$$A_1 = (1 + K(\omega))^{1/2}\left(\frac{1 + K(\omega_2)^{1/2}}{\omega_1(\omega_2)}\right) \tag{50}$$

$$B_1 = -\left(\frac{1 + K(\omega_2)^{1/2}}{\omega_2}\right)\left(K_1 - \frac{Y_1'}{Z_1(K_a^2)}\right) - \left(\frac{1 + K(\omega_1)^{1/2}}{\omega_1}\right)\left(K_2 + \frac{Y_2''}{Z_1(K_b^2)}\right) \tag{51}$$

$$C_1 = K_1(K_2) + \left(\frac{Y_2''(K_1)}{Z_1(K_b^2)}\right) - \left(\frac{(Y_1'(K_2)}{Z_1(K_a^2)}\right) \tag{52}$$

$$A_2\left(\frac{R_{dc}}{L^2}\right) + B_2\left(\frac{R_{dc}}{L}\right) + C_2 = 0 \tag{53}$$

$$A_2 = (1 + K(\omega_2)^{1/2})\left(\frac{1 + K(\omega_3)^{1/2}}{\omega_2(\omega_3)}\right) \tag{54}$$

$$B_2 = -\left(\frac{1 + K(\omega_3)^{1/2}}{\omega_3}\right)\left(K_2 + \frac{Y_2''}{Z_3(K_b{}^2)}\right) \quad (55)$$

$$\left(\frac{1 + K(\omega_2)^{1/2}}{\omega_2}\right)\left(K_3 + \frac{Y_3'''}{Z_3(K_c{}^2)}\right)$$

$$C_2 = K_2(K_3) + \left(\frac{Y_3'''(K_2)}{Z_3(K_c{}^2)}\right) - \left(\frac{Y_2''(K_3)}{Z_3(K_b{}^2)}\right) \quad (56)$$

One of the ways to solve the quadratic equations is to use the expression for $R_{dc}/L$ in equations 57 and 58 below. The skin constant K is also unknown. To solve for $R_{dc}/L$, values of K can be chosen until equations 57 and 58 give the same result. When using this approach, one must consider that only one of the polarities for each equation can give the correct result.

$$\frac{R_{dc}}{L} = \left[\frac{-B_1 \pm \sqrt{B_1{}^2 - 4A_1C_1}}{2A_1}\right] \quad (57)$$

$$\frac{R_{dc}}{L} = \left[\frac{-B_2 \pm \sqrt{B_2{}^2 - 4A_2C_2}}{2A_2}\right] \quad (58)$$

Another method for solving the quadratic equations is to solve each equation for both $R_{dc}/L$ and $(R_{dc}/L)^2$ and use the resulting equations for each frequency to eliminate one of the terms ($R_{dc}/L$ or $(R_{dc}/L)^2$). The following expressions for $R_{dc}/L$ can be derived from equations 49 and 53.

$$\frac{R_{dc}}{L} = \frac{C_2A_1 - C_1A_2}{B_1A_2 - B_2A_1} \quad (59)$$

$$\frac{R_{dc}}{L} = \left[\frac{C_1B_2 - C_1B_2}{A_1B_2 - A_2B_1}\right]^{1/2}, \left(\frac{R_{dc}}{L}\right)^2 = \frac{C_2B_1 - C_1B_2}{A_1B_2 - A_2B_1} \quad (60)$$

Using equations 59 and 60, $R_{dc}/L$ and the skin constant K can be computed through a successive approximation. Equations 59 and 60 converge when the correct value for K is selected. When the values of either $(R_{dc}/L)^2$ or $R_{dc}/L$ are negative, it is clear that an incorrect K value has been selected. As such, a K should be chosen so that the polarity of these computed values is positive.

Figure 9:
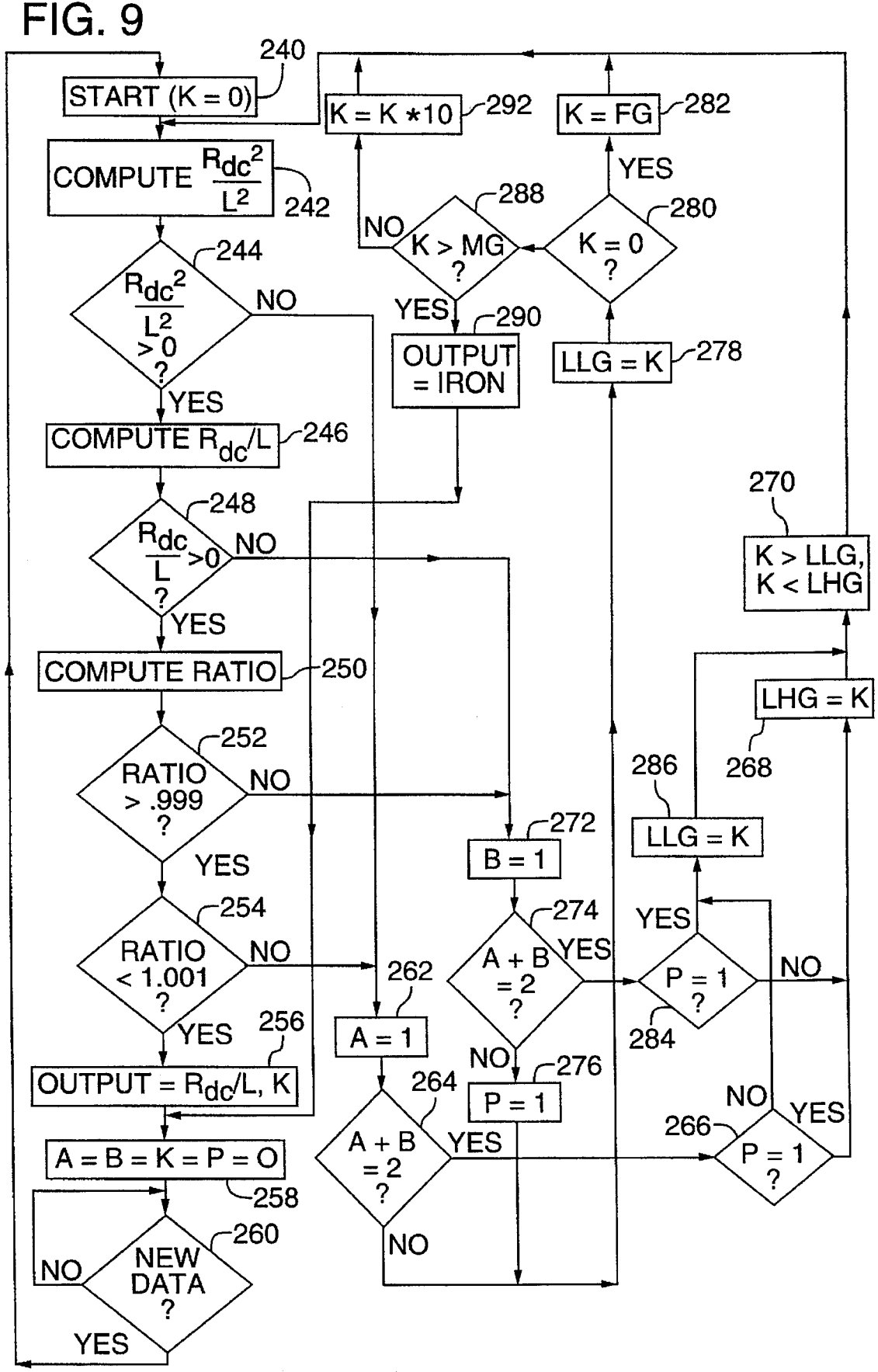
FIG. 9 is a flow diagram illustrating a method for computing $R_{dc}/L$ and a skin constant K for an unknown target in an embodiment of the invention.

FIG. 9 is a flow diagram illustrating a method for computing $R_{dc}/L$ and a skin constant K using successive approximation. The process of successive approximation begins by initializing the value of the skin constant K. In this method, the skin constant K is initialized to zero. By initializing K to zero, the polarity of $(R_{dc}/L)^2$ and $R_{dc}/L$, and the ratio between the results of equations 59 and 60 can be used to determine the relationship between $R_{dc}/L$ and K (either proportional or inversely proportional). After determining the relationship between $R_{dc}/L$ and K, the polarity errors can be avoided, and the value of K can be value for $R_{dc}/L$.

After initialization, $(R_{dc}/L)^2$ is computed according to equation 60. Before a ratio is computed between the results of equations 59 and 60, $(R_{dc}/L)^2$ and $R_{dc}/L$ must both be greater than zero. Note that either $(R_{dc}/L)^2$ or $R_{dc}/L$ may be used to compute a ratio between equations 59 and 60. In the first case, the result of equation 59 is squared and divided by the result of equation 60 ($(R_{dc}/L)^2$). In the second case, the result of equation 59 is divided by the square root of the result of equation 60 ($R_{dc}/L$). If the results of equations 59 and 60 are both positive, the ratio between equations 59 and 60 is computed as shown in step 250.

The process of a successive approximation proceeds until the ratio of the results of equations 59 and 60 is within a predefined tolerance to one (i.e. the results of the equations converge). If the ratio is within this tolerance of one, a value for $R_{dc}/L$ and the skin constant K has been found.

A polarity flag, P, indicates whether $R_{dc}/L$ is either directly or inversely proportional to the skin constant K. Extensive testing has shown that the polarity of $R_{dc}/L$ and $(R_{dc}/L)^2$ is indicative of this relationship. Once the nature of this relationship has been determined, the P flag is used to indicate whether the K is set to the last high or last low guess. Once a guess for K has been made on either side of the correct answer for K, both flags A and B are set and the polarity flag P is not altered until the method converges to a solution.

Referring to the path starting at block 244, the first flag (A) is set when $(R_{dc}/L)^2$ is negative. Next, the flags (A and B) are checked to determine which section of the process have been passed through. If both of the flags are not set, the skin constant K is set to a last low guess (LLG). In the first pass through the process, K is equal to zero, so it must be set to the first guess value (FG). In subsequent passes, the value of K is checked to determine whether it has exceeded a predefined maximum guess value (MG). If it has exceeded this value, the target is evaluated to be ferrous (Iron content) and processing proceeds at block 258 as described above.

However, if the skin constant K is still lower than the maximum predefined value (MG), then K is increased by a constant factor (10 in this case) and processing continues at block 242.

Referring back again to decision block 264, if flags A and B are set, then the polarity flag is checked. If the polarity flag is set, then the K is set to a last high guess (LHG) and processing continues with a return to block 242.

If the polarity flag is not set, then K is set to the last low guess (LLG) and processing continues back at block 242.

Referring to decision block 248, if $R_{dc}/L$ is computed to be negative from equation 59, then processing continues at block 272. At this point, the flag B is set. In the next decision block 274, the flags A and B are evaluated to determine whether a polarity reversal has occurred. If both flags A and B are not set, then the polarity reversal flag is set to one, as shown in block 276. Processing then continues at block 278, where the skin constant K is assigned to the last low guess.

Again, if this pass is the first pass through the successive approximation method then the skin constant K is set to a predefined first guess value (FG). Otherwise, K is evaluated to determine whether it is under the maximum predefined value as described above. During the first pass through the method, the K value is zero. As long as K is lower than the actual K value, it is increased by a constant factor. After the first guess has occurred, subsequent guesses are increased by this constant factor, assuming that the first guess is below the actual K value. Once the method has exceeded the actual K value, the path starting with block 278 is no longer used. Instead the path starting either with block 268 or 286 is used to guess between the saved K values on either side of the actual K value. At this point, the polarity flag P is fixed at 1 and error detection (blocks 252 and 254) are used to determine if a guess is high or low relative to the actual K value.

If both the first and second flags are set, then processing continues at decision block 284, where the polarity reversal flag (P) is evaluated. If the polarity reversal flag is set, then K is assigned to the last low guess and processing continues back at block 242. Otherwise, K is set to the last high guess. Before processing continues back at block 242, a new value between LLG and LHG is selected (270).

Equations 59 and 60 are evaluated and the value of the skin constant is adjusted until the ratio between the results of equations 59 and 60 are equal to one, within a predefined tolerance. When the ratio is equal to one (within this tolerance), the successive approximation process has converged to a value for $R_{dc}/L$ within the predefined tolerance.

The skin constant is also known at that point. Both the ratio of $R_{dc}/L$ and the skin constant can then be conveyed to the user or processed further to provide specific information regarding the type of target.

Once $R_{dc}/L$ and K are known, other information about the target can be derived. For instance, $\omega L/R$ at a given frequency can be computed. As such, computing $R_{dc}/L$ and K is another way to compute a resistive to reactive ratio. The peak frequency for an unknown target can be computed. The peak frequency is the frequency at which $R_{ac}=\omega L$, and is also the frequency at which the phase shift is at 45°. The peak frequency provides another piece of data to help identify the target type.

In addition, the X-Y (or the reactive and resistive components) can be plotted over frequency. The plot can be displayed to the user as a means for identifying an unknown target.

After a solution for $R_{dc}/L$ and K has been found, the control flags and K are set to zero. The target evaluation system then waits for new data as reflected by the loop shown in block 260 in FIG. 9. The process of successive approximation can then be repeated.

While I have explained one method for computing $R_{dc}/L$ and the skin constant K, there are a variety of other ways to compute these values. An alternative way is to compute $R_{dc}/L$ and K directly using the background excluded components. One equation for computing $R_{dc}/L$ is provided below.

$$\frac{R_{dc}}{L} = \frac{\frac{BZ_2\omega_1}{1+K(\omega_1)^{1/2}} - \frac{AZ_4\omega_3}{1+K(\omega_3)^{1/2}}}{B\left(\frac{Z_1}{K_1}\right) - A\left(\frac{Z_3}{K_3}\right)} \quad (61)$$

Where;

$$A = \frac{\omega_1(1+K(\omega_2)^{1/2})}{K_2\omega_2(1+K(\omega_1)^{1/2})} - \frac{1}{K_1} \quad (62)$$

$$B = \frac{1}{K_3} - \frac{\omega_3(1+K(\omega_2)^{1/2})}{K_2\omega_2(1+K(\omega_3)^{1/2})} \quad (63)$$

$$Z_2 = X_2'' - X_1' + \frac{Y_2''}{K_2} - \frac{Y_1'}{K_1} \quad (64)$$

$$Z_4 = X_3''' - X_2'' + \frac{Y_3'''}{K_3} - \frac{Y_2''}{K_1} \quad (65)$$

Equation 61 provides an expression for $R_{dc}/L$ in terms of known data and the skin constant K. A direct, singular solution can be found for $R_{dc}/L$ by solving one of the previous $R_{dc}/L$ equations for the skin constant K. If this is used to replace K in equation 61, the result can be solved for $R_{dc}/L$. A direct, singular solution for K can be found in a similar manner.

Since equation 61 provides a solution for $R_{dc}/L$ for a given K, it can be used to successively approximate $R_{dc}/L$ and the skin constant K. For example, any of the equations for $R_{dc}/L$ listed above can be used by entering the same data and K until the values for $R_{dc}/L$ match. A variety of other alternative methods are possible using the same general approach.

While I have described various embodiments in detail, I do not intend to limit the scope of my invention to these embodiments. Above I noted that aspects of the invention enable targets to be detected and identified in a background environment without requiring motion of the detector. However, aspects of my invention can be implemented in metal detectors that require motion to operate properly. For instance, a metal detector can be designed to generate a DC resistance to inductance ratio and a skin constant using the approaches described above, and it may also use motion to help distinguish a metal target from ground. A metal detector designed according to the invention can include a filter or filters to help remove a ground response. Thus while it is possible to have a metal detector designed in accordance with the invention without filters for removing ground, filters can also be used in combination with the approaches described above.

Having described and illustrated the principles of my invention with reference to a preferred embodiment and several variations thereon, it should be apparent that the invention can be modified in arrangement and detail without departing from its principles. Accordingly, I claim all modifications as may come within the scope and spirit of the following claims.

I claim:

1. In a metal detector, a method for identifying a target comprising:

transmitting from the detector two or more signals at different frequencies in the direction of the target;

receiving signal responses for the two or more signals that at least in part are attributable to the target;

measuring first and second components from the received signal responses; and deriving data representing skin effect of the target from the first and second components, and the frequencies of the two or more signals, wherein the data representing skin effect is data computed from the first and second components that characterizes target type of the target.

2. The method of claim 1 further including:

deriving a skin constant of the target from the first and second components, and the frequencies of the two or more signals, wherein the data representing the skin effect includes the skin constant.

3. The method of claim 2 wherein the measuring step includes filtering the first and second components of the two or more signals to remove a background response; and to generate filtered resistive and reactive components;

wherein the deriving step includes deriving a ratio of inductance to DC resistance of the target and the skin constant from the filtered resistive and reactive components.

4. The method of claim 2 wherein the receiving step includes receiving the signal responses for the two or more signals in a search loop having a differential configuration to generate background excluded response signals;

wherein the measuring of the first and second components comprises measuring background excluded components from the background excluded response signals; and wherein the deriving step includes deriving a ratio of inductance to DC resistance of the target and the skin constant from the background excluded components.

5. The method of claim 2 wherein the transmitting step includes transmitting three or more signals at different frequencies;

wherein the receiving step includes receiving signal responses for the three or more different frequencies;

wherein the measuring step includes measuring the first and second components from each of the received signal responses, and producing background excluded components by subtracting first components from each other to remove a background response portion of the first components attributable to a background environment; and wherein the deriving step includes deriving a ratio of inductance to DC resistance and the skin constant from the background excluded components.

6. In a metal detector, a method for generating target data comprising:
   transmitting from the detector at least two signals of different frequencies including a first signal at a first frequency, a second signal at a second frequency, and a third signal at a third frequency;
   receiving responses to the first, second, and third signals;
   measuring the response to the first signal at a first and second phase to determine first and second signal components of the response to the first signal;
   measuring the response to the second signal at a first and second phase to determine first and second signal components of the response to the second signal;
   measuring the response to the third signal at a first and second phase to determine first and second signal components of the response to the third signal;
   processing the first and second signal components of the responses to the first, second, and third signals to remove a background response, the processing step including removing the background response from the first and second signal components of the responses to the first, second and third signals by subtracting first or second signal components measured at different frequencies from each other to find background excluded components; and
   processing the background excluded components using a target model that models a target based at least in part on the skin effect produced by the target when subjected to the transmitted signals from the detector to generate target specific data to evaluate a target.

7. The method of claim 6 wherein the step of processing the background excluded components using the target model that includes skin effect to compute a DC resistance to inductance ratio and a skin constant.

8. A metal detector comprising:
   a coil assembly for transmitting at least first, second, and third signals from the detector at first, second and third frequencies, respectively, in the direction of a background environment including a metal target, and for receiving at least first, second, and third response signals at the first, second, and third frequencies, respectively, wherein the response signals include a background response due to the background environment and a response due to the target;
   at least first and second phase detectors coupled to the coil assembly for measuring first and second signal components at first and second phases, respectively, of the first, second, and third response signals; and
   a signal processor coupled to the at least first and second phase detectors for receiving the first and second signal components of the first, second, and third response signals, for processing the first and second signal components of the first, second, and third response signals to remove the background response by subtracting signal components measured at different frequencies from each other to generate background excluded response data, and for processing the background excluded response data to compute data representing skin effect of the target, wherein the data representing skin effect of the target characterizes target type of the target.

9. In a metal detector, a method for identifying target type of a target in a background environment, the method comprising:
   transmitting from the detector at least two signals of different frequencies including a first signal at a first frequency, and a second signal at a second frequency;
   receiving responses to the first, and second signals, wherein the responses include a background response due to the background environment and a response due to the target;
   measuring the response to the first signal at a first and second phase to determine first and second signal components of the response to the first signal;
   measuring the response to the second signal at a first and second phase to determine first and second signal components of the response to the second signal;
   generating filtered resistive and reactive component data from the first and second signal components of the responses to the first and second signals; and
   computing data representing skin effect of the target from the filtered resistive and reactive component data, wherein the data representing skin effect of the target characterizes target type of the target.

10. A metal detector comprising:
    a coil assembly for transmitting at least first, and second signals from the detector at first, and second frequencies, respectively, in the direction of a background environment including a metal target, and for receiving at least first and second response signals at first and second frequencies, respectively, wherein the response signals include a background response due to the background environment and a response due to the target;
    at least first and second phase detectors coupled to the coil assembly for measuring first and second signal components at first and second phases, respectively, of the first and second response signals; and
    a signal processor coupled to the first and second phase detectors, the signal processor operable to evaluate a target type of a target in a background environment by deriving data representing skin effect of the target from the first and second signal components of the first and second response signals, wherein the data representing skin effect of the target characterizes target type of the target.

11. The metal detector of claim 10 further including:
    a first filter coupled to the first phase detector, the first filter operable to remove at least a first portion of a background response from the first signal component to produce a first background excluded component;
    a second filter coupled to the second phase detector, the second filter operable to remove at least a second portion of the background response from the second signal component to produce a second background excluded component;
    wherein the signal processor includes the first and second filter, and wherein the signal processor is operable to derive a DC resistance to inductance ratio and a skin constant of the target from the first and second background excluded components of the first and second response signals, wherein the data representing skin effect of the target includes the DC resistance to inductance ratio and the skin constant.

12. The metal detector of claim 10 further including:
    a first filter coupled to the first phase detector, the first filter operable to remove at least a first portion of a background response from the first signal component to produce a first background excluded component;

a second filter coupled to the second phase detector, the second filter operable to remove at least a second portion of the background response from the second signal component to produce a second background excluded component;

wherein the signal processor is coupled to the first and second filters to receive the first and second background excluded components, and wherein the signal processor is operable to derive a DC resistance to inductance ratio and a skin constant from the first and second background excluded components of the first and second response signals, wherein the data representing skin effect of the target includes the DC resistance to inductance ratio and the skin constant.

13. The metal detector of claim 10 wherein the coil assembly has a differential configuration to remove at least a portion of a background response from the first and second response signals to produce first and second background excluded responses; wherein the first and second phase detectors are operable to receive the first and second background excluded responses and measure first and second background excluded components for the first and second background excluded responses; and wherein the signal processor is operable to derive a DC resistance to inductance ratio and a skin constant from the first and second background excluded components, wherein the data representing skin effect of the target includes the DC resistance to inductance ratio and the skin constant.

14. The method of claim 6 wherein the processing step includes adjusting the first and second signal components of the responses to the first, second, and third signals before subtracting the first or second signal components measured at different frequencies from each other.

* * * * *

UNITED STATES PATENT AND TRADEMARK OFFICE
CERTIFICATE OF CORRECTION

PATENT NO. : 5,642,050

DATED : June 24, 1997

INVENTOR(S) : Donald K. Shoemaker

It is certified that error appears in the above-identified patent and that said Letters Patent is hereby corrected as shown below:

Column 9, line 51, --X(f2)'-- should read --X(f2)"--.

Column 12, line 12, "fails" should read --falls--.

Column 12, line 31, "(O$_1$Y$_1$" should read --(O,Y$_1$--.

Column 13, line 2, "X$_2$-X" should read -- X$_2$-X$_1$,--.

Column 18, lines 13-14, " $K_{G_2}(K_a)\left(1-K_2\left(\dfrac{L\omega_2}{R_2}\right)\right)$ " should read -- $K_{G_2}(K_b)\left(1-K_2\left(\dfrac{L\omega_2}{R_2}\right)\right)$ --.

Column 18, lines 27-29, " $Z_3 = \dfrac{Y_3''}{K_b^2\left(\dfrac{R_3}{L\omega_3}-K_3\right)} - \dfrac{Y_2'}{K_a^2\left(\dfrac{R_2}{L\omega_2}-K_2\right)}$ " should read --

$Z_3 = \dfrac{Y_3'''}{K_c^2\left(\dfrac{R_3}{L\omega_3}-K_3\right)} - \dfrac{Y_2''}{K_b^2\left(\dfrac{R_2}{L\omega_2}-K_2\right)}$ --.

UNITED STATES PATENT AND TRADEMARK OFFICE
CERTIFICATE OF CORRECTION

PATENT NO. : 5,642,050
DATED : June 24, 1997
INVENTOR(S) : Donald K. Shoemaker

It is certified that error appears in the above-identified patent and that said Letters Patent is hereby corrected as shown below:

Column 18, line 50, " $A_1 = (1 + K(\omega)^{1/2}) \left( \dfrac{1 + K(\omega_2)^{1/2}}{\omega_1(\omega_2)} \right)$ " should read $$-- A_1 = (1 + K(\omega_1)^{1/2}) \left( \dfrac{1 + K(\omega_2)^{1/2}}{\omega_1(\omega_2)} \right) --.$$

Column 19, lines 1-3, " $B_2 = -\left( \dfrac{1 + K(\omega_3)^{1/2}}{\omega_3} \right) \left( K_2 + \dfrac{Y_2''}{Z_3(K_b^2)} \right)$ " should read $$-- B_2 = -\left( \dfrac{1 + K(\omega_3)^{1/2}}{\omega_3} \right) \left( K_2 - + \dfrac{Y_2''}{Z_3(K_b^2)} \right) \quad -- \quad --.$$

UNITED STATES PATENT AND TRADEMARK OFFICE
CERTIFICATE OF CORRECTION

PATENT NO. : 5,642,050
DATED : June 24, 1997
INVENTOR(S) : Donald K. Shoemaker

It is certified that error appears in the above-identified patent and that said Letters Patent is hereby corrected as shown below:

Column 19, lines 33-34, " $\dfrac{R_{dc}}{L} = \left[\dfrac{C_1 B_2 - C_1 B_2}{A_1 B_2 - A_2 B_1}\right]^{1/2}$ , $\left(\dfrac{R_{dc}}{L}\right)^2 = \dfrac{C_2 B_1 - C_1 B_2}{A_1 B_2 - A_2 B_1}$ "

should read -- $\dfrac{R_{dc}}{L} = \left[\dfrac{C_2 B_1 - C_1 B_2}{A_1 B_2 - A_2 B_1}\right]^{1/2}$ , $\left(\dfrac{R_{dc}}{L}\right)^2 = \dfrac{C_2 B_1 - C_1 B_2}{A_1 B_2 - A_2 B_1}$ --.

Column 19, line 51, "can be value" should read --can be successfully approximated until the results of equations 59 and 60 converge on a value--.

Column 21, line 34, "Where;" should read --Where:--.

Signed and Sealed this

Twentieth Day of June, 2000

Attest:

Q. TODD DICKINSON

*Attesting Officer*   *Director of Patents and Trademarks*